United States Patent
Shukla et al.

(10) Patent No.: US 10,160,438 B2
(45) Date of Patent: Dec. 25, 2018

(54) MULTI-MODE ELECTROMECHANICAL VARIABLE TRANSMISSION

(71) Applicant: Oshkosh Corporation, Oshkosh, WI (US)

(72) Inventors: Deepak Shukla, Appleton, WI (US); Andrew Kotloski, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 15/892,848

(22) Filed: Feb. 9, 2018

(65) Prior Publication Data

US 2018/0162351 A1    Jun. 14, 2018

Related U.S. Application Data

(63) Continuation of application No. 15/601,670, filed on May 22, 2017, now Pat. No. 9,908,520, which is a
(Continued)

(51) Int. Cl.
*B60W 20/10*    (2016.01)
*B60W 10/02*    (2006.01)
(Continued)

(52) U.S. Cl.
CPC ............ *B60W 20/10* (2013.01); *B60K 6/365* (2013.01); *B60K 6/387* (2013.01); *B60K 6/445* (2013.01);
(Continued)

(58) Field of Classification Search
None
See application file for complete search history.

(56) References Cited

U.S. PATENT DOCUMENTS 1,951,089 A    3/1934  Fielder
3,524,069 A    8/1970  Stepanov et al.
(Continued)

FOREIGN PATENT DOCUMENTS

CN    101323243 A    12/2008
DE    18 16 183        6/1970
(Continued)

OTHER PUBLICATIONS

US 7,154,246, 12/2006, Heap (withdrawn)
(Continued)

*Primary Examiner* — Jacob S. Scott
(74) *Attorney, Agent, or Firm* — Foley & Lardner LLP

(57) ABSTRACT

A vehicle includes a drive axle, a multi-mode transmission, and a controller coupled to the multi-mode transmission. The multi-mode transmission includes a first gear set having a first planetary gear carrier and a second gear set having a second planetary gear carrier, a first motor/generator coupled to the first gear set, a second motor/generator coupled to the second gear set and selectively coupled to a connecting shaft, a brake positioned to selectively limit a rotational movement of a ring gear of the second gear set when engaged, a first clutch selectively rotationally coupling the first gear set and the second gear set to the drive axle when engaged, and a second clutch selectively rotationally coupling the second motor/generator to the connecting shaft when engaged. The controller is configured to engage the brake and the clutches to selectively reconfigure the multi-mode transmission to an intermediate shift mode of operation.

20 Claims, 10 Drawing Sheets

Related U.S. Application Data continuation of application No. 14/792,535, filed on Jul. 6, 2015, now Pat. No. 9,656,659, which is a continuation-in-part of application No. 14/624,285, filed on Feb. 17, 2015, now Pat. No. 9,651,120.

(51) Int. Cl.

| | | |
|---|---|---|
| *B60W 10/105* | (2012.01) | |
| *B60W 10/08* | (2006.01) | |
| *B60K 6/365* | (2007.10) | |
| *B60K 6/387* | (2007.10) | |
| *B60K 6/445* | (2007.10) | |
| *F16H 3/72* | (2006.01) | |
| *F16H 37/10* | (2006.01) | |
| *B60W 30/19* | (2012.01) | |
| B60K 6/38 | (2007.10) | |
| F16H 37/08 | (2006.01) | |

(52) U.S. Cl.
CPC ............ *B60W 10/02* (2013.01); *B60W 10/08* (2013.01); *B60W 10/105* (2013.01); *B60W 30/19* (2013.01); *F16H 3/727* (2013.01); *F16H 3/728* (2013.01); *B60K 2006/381* (2013.01); *F16H 2037/0873* (2013.01); *F16H 2037/101* (2013.01); *F16H 2200/2007* (2013.01); *F16H 2200/2043* (2013.01); *Y02T 10/6239* (2013.01); *Y10S 903/917* (2013.01); *Y10S 903/93* (2013.01)

(56) References Cited

U.S. PATENT DOCUMENTS

| | | |
|---|---|---|
| 3,690,559 A | 9/1972 | Rudloff |
| 3,764,867 A | 10/1973 | Smi |
| 3,799,284 A | 3/1974 | Hender |
| 3,865,209 A | 2/1975 | Aihara et al. |
| 3,966,067 A | 6/1976 | Reese |
| 4,021,704 A | 5/1977 | Norbeck |
| 4,088,934 A | 5/1978 | D'Atre et al. |
| 4,097,925 A | 6/1978 | Butler, Jr. |
| 4,113,045 A | 9/1978 | Downing, Jr. |
| 4,196,785 A | 4/1980 | Downing, Jr. |
| 4,292,531 A | 9/1981 | Williamson |
| 4,319,140 A | 3/1982 | Paschke |
| 4,336,418 A | 6/1982 | Hoag |
| 4,347,907 A | 9/1982 | Downing, Jr. |
| 4,411,171 A | 10/1983 | Fiala |
| 4,423,362 A | 12/1983 | Konrad et al. |
| 4,423,794 A | 1/1984 | Beck |
| 4,444,285 A | 4/1984 | Stewart et al. |
| 4,461,988 A | 7/1984 | Plunkett |
| 4,533,011 A | 8/1985 | Heidemeyer et al. |
| 4,562,894 A | 1/1986 | Yang |
| 4,719,361 A | 1/1988 | Brubaker |
| 4,760,275 A | 7/1988 | Sato et al. |
| 4,774,399 A | 9/1988 | Fujita et al. |
| 4,774,811 A | 10/1988 | Kawamura |
| 4,809,177 A | 2/1989 | Windle et al. |
| 4,953,646 A | 9/1990 | Kim |
| 4,966,242 A | 10/1990 | Baillargeon |
| 4,985,845 A | 1/1991 | Goetz et al. |
| 5,067,932 A | 11/1991 | Edwards |
| 5,081,832 A | 1/1992 | Mowill |
| 5,120,282 A | 6/1992 | Fjaellstroem |
| 5,168,946 A | 12/1992 | Dorgan |
| 5,180,456 A | 1/1993 | Schultz et al. |
| 5,195,600 A | 3/1993 | Dorgan |
| 5,201,629 A | 4/1993 | Simpson et al. |
| 5,227,703 A | 7/1993 | Boothe et al. |
| 5,263,524 A | 11/1993 | Boardman |
| 5,264,763 A | 11/1993 | Avitan |
| 5,289,093 A | 2/1994 | Jobard |
| 5,291,960 A | 3/1994 | Brandenburg et al. |
| 5,343,971 A | 9/1994 | Heidelberg et al. |
| 5,345,154 A | 9/1994 | King |
| 5,369,540 A | 11/1994 | Konrad et al. |
| 5,389,825 A | 2/1995 | Ishikawa et al. |
| 5,409,425 A | 4/1995 | Shibahata |
| 5,417,299 A | 5/1995 | Pillar et al. |
| 5,418,437 A | 5/1995 | Couture et al. |
| 5,448,561 A | 9/1995 | Kaiser et al. |
| 5,498,208 A | 3/1996 | Braun |
| 5,501,567 A | 3/1996 | Lanzdorf et al. |
| 5,504,655 A | 4/1996 | Underwood et al. |
| 5,508,594 A | 4/1996 | Underwood et al. |
| 5,508,689 A | 4/1996 | Rado et al. |
| 5,516,379 A | 5/1996 | Schultz |
| 5,538,274 A | 7/1996 | Schmitz et al. |
| 5,558,175 A | 9/1996 | Sherman |
| 5,558,588 A | 9/1996 | Schmidt |
| 5,558,589 A | 9/1996 | Schmidt |
| 5,558,595 A | 9/1996 | Schmidt et al. |
| 5,568,023 A | 10/1996 | Grayer et al. |
| 5,575,730 A | 11/1996 | Edwards et al. |
| 5,575,737 A | 11/1996 | Weiss |
| 5,586,613 A | 12/1996 | Ehsani |
| 5,589,743 A | 12/1996 | King |
| 5,607,028 A | 3/1997 | Braun et al. |
| 5,629,567 A | 5/1997 | Kumar |
| 5,629,603 A | 5/1997 | Kinoshita |
| 5,646,510 A | 7/1997 | Kumar |
| 5,669,470 A | 9/1997 | Ross |
| 5,669,842 A | 9/1997 | Schmidt |
| 5,672,920 A | 9/1997 | Donegan et al. |
| 5,679,085 A | 10/1997 | Fredriksen et al. |
| 5,713,425 A | 2/1998 | Buschhaus et al. |
| 5,722,502 A | 3/1998 | Kubo |
| 5,767,584 A | 6/1998 | Gore et al. |
| 5,786,640 A | 7/1998 | Sakai et al. |
| 5,789,882 A | 8/1998 | Ibaraki et al. |
| 5,813,487 A | 9/1998 | Lee et al. |
| 5,813,488 A | 9/1998 | Weiss |
| 5,820,150 A | 10/1998 | Archer et al. |
| 5,820,258 A | 10/1998 | Braun |
| 5,828,554 A | 10/1998 | Donegan et al. |
| 5,847,520 A | 12/1998 | Theurillat et al. |
| 5,865,263 A | 2/1999 | Yamaguchi et al. |
| 5,879,265 A | 3/1999 | Bek |
| 5,880,570 A | 3/1999 | Tamaki et al. |
| 5,881,559 A | 3/1999 | Kawamura |
| 5,895,333 A | 4/1999 | Morisawa et al. |
| 5,924,879 A | 7/1999 | Kameyama |
| 5,925,993 A | 7/1999 | Lansberry |
| 5,927,417 A | 7/1999 | Brunner et al. |
| 5,934,395 A | 8/1999 | Koide et al. |
| 5,939,794 A | 8/1999 | Sakai et al. |
| 5,947,855 A | 9/1999 | Weiss |
| 5,957,985 A | 9/1999 | Wong et al. |
| 5,973,463 A | 10/1999 | Okuda et al. |
| 5,980,410 A | 11/1999 | Stemler et al. |
| 5,986,416 A | 11/1999 | Dubois |
| 5,991,683 A | 11/1999 | Takaoka et al. |
| 5,998,880 A | 12/1999 | Kumar |
| 6,005,358 A | 12/1999 | Radev |
| 6,012,004 A | 1/2000 | Sugano et al. |
| 6,028,403 A | 2/2000 | Fukatsu |
| 6,038,500 A | 3/2000 | Weiss |
| 6,054,844 A | 4/2000 | Frank |
| 6,086,074 A | 7/2000 | Braun |
| 6,104,148 A | 8/2000 | Kumar et al. |
| 6,105,984 A | 8/2000 | Schmitz et al. |
| 6,110,066 A | 8/2000 | Nedungadi et al. |
| 6,201,310 B1 | 3/2001 | Adachi et al. |
| 6,298,932 B1 | 10/2001 | Bowman et al. |
| 6,356,817 B1 | 3/2002 | Abe |
| 6,371,878 B1 | 4/2002 | Bowen |
| 6,387,007 B1 | 5/2002 | Fini, Jr. |
| 6,404,607 B1 | 6/2002 | Burgess et al. |
| 6,421,593 B1 | 7/2002 | Kempen et al. |
| 6,434,470 B1 | 8/2002 | Nantz et al. |
| 6,478,705 B1 | 11/2002 | Holmes et al. |

(56) References Cited

U.S. PATENT DOCUMENTS

| | | |
|---|---|---|
| 6,496,393 B1 | 12/2002 | Patwardhan |
| 6,501,368 B1 | 12/2002 | Wiebe et al. |
| 6,516,914 B1 | 2/2003 | Andersen et al. |
| 6,520,494 B1 | 2/2003 | Andersen et al. |
| 6,553,287 B1 | 4/2003 | Supina et al. |
| 6,553,290 B1 | 4/2003 | Pillar |
| 6,561,718 B1 | 5/2003 | Archer et al. |
| 6,563,230 B2 | 5/2003 | Nada |
| 6,575,866 B2 | 6/2003 | Bowen |
| 6,580,953 B1 | 6/2003 | Wiebe et al. |
| 6,607,466 B2 | 8/2003 | Bordini |
| 6,611,116 B2 | 8/2003 | Bachman et al. |
| 6,702,709 B2 | 3/2004 | Bowen |
| 6,722,458 B2 | 4/2004 | Hofbauer |
| 6,726,592 B2 | 4/2004 | Kotani |
| 6,757,597 B2 | 6/2004 | Yakes et al. |
| 6,764,085 B1 | 7/2004 | Anderson |
| 6,793,600 B2 | 9/2004 | Hiraiwa |
| 6,819,985 B2 | 11/2004 | Minagawa et al. |
| 6,846,257 B2 | 1/2005 | Baker et al. |
| 6,852,053 B2 | 2/2005 | Nakano et al. |
| 6,852,054 B2 | 2/2005 | Tumback et al. |
| 6,860,332 B1 | 3/2005 | Archer et al. |
| 6,882,917 B2 | 4/2005 | Pillar et al. |
| 6,885,920 B2 | 4/2005 | Yakes et al. |
| 6,886,647 B1 | 5/2005 | Gotta |
| 6,909,944 B2 | 6/2005 | Pillar et al. |
| 6,922,615 B2 | 7/2005 | Pillar et al. |
| 6,953,409 B2 | 10/2005 | Schmidt et al. |
| 6,973,600 B2 | 12/2005 | Lau et al. |
| 6,976,688 B2 | 12/2005 | Archer et al. |
| 6,991,054 B2 | 1/2006 | Takaoka et al. |
| 6,993,421 B2 | 1/2006 | Pillar et al. |
| 6,994,646 B2 | 2/2006 | Ai |
| 7,000,717 B2 | 2/2006 | Ai et al. |
| 7,004,868 B2 | 2/2006 | Oshidari et al. |
| 7,006,902 B2 | 2/2006 | Archer et al. |
| 7,024,296 B2 | 4/2006 | Squires et al. |
| 7,053,566 B2 | 5/2006 | Aizawa et al. |
| 7,072,745 B2 | 7/2006 | Pillar et al. |
| 7,073,620 B2 | 7/2006 | Braun et al. |
| 7,073,847 B2 | 7/2006 | Morrow et al. |
| 7,076,356 B2 | 7/2006 | Hubbard et al. |
| 7,086,977 B2 | 8/2006 | Supina et al. |
| 7,107,129 B2 | 9/2006 | Rowe et al. |
| 7,127,331 B2 | 10/2006 | Pillar et al. |
| 7,140,461 B2 | 11/2006 | Morrow |
| 7,154,236 B1 | 12/2006 | Heap |
| 7,162,332 B2 | 1/2007 | Pillar et al. |
| 7,164,977 B2 | 1/2007 | Yakes et al. |
| 7,179,187 B2 | 2/2007 | Raghavan et al. |
| 7,184,862 B2 | 2/2007 | Pillar et al. |
| 7,184,866 B2 | 2/2007 | Squires et al. |
| 7,196,430 B2 | 3/2007 | Yang |
| 7,204,776 B2 | 4/2007 | Minagawa et al. |
| 7,217,211 B2 | 5/2007 | Klemen et al. |
| 7,219,756 B2 | 5/2007 | Bischoff |
| 7,223,200 B2 | 5/2007 | Kojima et al. |
| 7,234,534 B2 | 6/2007 | Froland et al. |
| 7,246,672 B2 | 7/2007 | Shirai et al. |
| 7,254,468 B2 | 8/2007 | Pillar et al. |
| 7,258,194 B2 | 8/2007 | Braun et al. |
| 7,274,976 B2 | 9/2007 | Rowe et al. |
| 7,276,007 B2 | 10/2007 | Takami et al. |
| 7,277,782 B2 | 10/2007 | Yakes et al. |
| 7,282,003 B2 | 10/2007 | Klemen et al. |
| 7,302,320 B2 | 11/2007 | Nasr et al. |
| 7,306,064 B2 | 12/2007 | Imazu et al. |
| 7,322,896 B2 | 1/2008 | Minagawa |
| 7,338,401 B2 | 3/2008 | Klemen et al. |
| 7,357,203 B2 | 4/2008 | Morrow et al. |
| 7,363,996 B2 | 4/2008 | Kamada et al. |
| 7,367,415 B2 | 5/2008 | Oliver et al. |
| 7,367,911 B2 | 5/2008 | Reghavan et al. |
| 7,379,797 B2 | 5/2008 | Nasr et al. |
| 7,392,122 B2 | 6/2008 | Pillar et al. |
| 7,412,307 B2 | 8/2008 | Pillar et al. |
| 7,419,021 B2 | 9/2008 | Morrow et al. |
| 7,439,711 B2 | 10/2008 | Bolton |
| 7,448,460 B2 | 11/2008 | Morrow et al. |
| 7,451,028 B2 | 11/2008 | Pillar et al. |
| 7,462,122 B2 | 12/2008 | Reghavan et al. |
| 7,467,678 B2 | 12/2008 | Tanaka et al. |
| 7,479,080 B2 | 1/2009 | Usoro |
| 7,493,980 B2 | 2/2009 | Hidaka |
| 7,520,354 B2 | 4/2009 | Morrow et al. |
| 7,521,814 B2 | 4/2009 | Nasr |
| 7,522,979 B2 | 4/2009 | Pillar |
| 7,527,573 B2 | 5/2009 | Lang et al. |
| 7,555,369 B2 | 6/2009 | Pillar et al. |
| 7,572,201 B2 | 8/2009 | Supina et al. |
| 7,576,501 B2 | 8/2009 | Okubo et al. |
| 7,597,164 B2 | 10/2009 | Severinsky et al. |
| 7,601,093 B2 | 10/2009 | Tabata et al. |
| 7,635,039 B2 | 12/2009 | Fujiwara et al. |
| 7,678,014 B2 | 3/2010 | Nohara et al. |
| 7,689,332 B2 | 3/2010 | Yakes et al. |
| 7,711,460 B2 | 5/2010 | Yakes et al. |
| 7,715,962 B2 | 5/2010 | Rowe et al. |
| 7,725,225 B2 | 5/2010 | Pillar et al. |
| 7,729,831 B2 | 6/2010 | Pillar et al. |
| 7,749,131 B2 | 7/2010 | Imamura et al. |
| 7,756,621 B2 | 7/2010 | Pillar et al. |
| 7,784,554 B2 | 8/2010 | Grady et al. |
| 7,792,618 B2 | 9/2010 | Quigley et al. |
| 7,811,191 B2 | 10/2010 | Iwase et al. |
| 7,824,293 B2 | 11/2010 | Schimke |
| 7,835,838 B2 | 11/2010 | Pillar et al. |
| 7,848,857 B2 | 12/2010 | Nasr et al. |
| 7,874,373 B2 | 1/2011 | Morrow et al. |
| 7,878,750 B2 | 2/2011 | Zhou et al. |
| 7,888,894 B2 | 2/2011 | Sugawara et al. |
| 7,908,063 B2 | 3/2011 | Sah |
| 7,927,250 B2 | 4/2011 | Imamura et al. |
| 7,931,103 B2 | 4/2011 | Morrow et al. |
| 7,935,021 B2 | 5/2011 | Tabata et al. |
| 7,935,022 B2 | 5/2011 | Iwase et al. |
| 7,937,194 B2 | 5/2011 | Nasr et al. |
| 7,941,259 B2 | 5/2011 | Tabata et al. |
| 7,972,237 B2 | 7/2011 | Ota |
| 8,000,850 B2 | 8/2011 | Nasr et al. |
| 8,007,402 B2 | 8/2011 | Tabata et al. |
| 8,038,572 B2 | 10/2011 | Matsubara et al. |
| 8,062,172 B2 | 11/2011 | Supina et al. |
| 8,068,947 B2 | 11/2011 | Conlon et al. |
| 8,091,662 B2 | 1/2012 | Tolksdorf |
| 8,095,247 B2 | 1/2012 | Pillar et al. |
| 8,123,645 B2 | 2/2012 | Schimke |
| 8,337,352 B2 | 12/2012 | Morrow et al. |
| 8,444,517 B2 | 5/2013 | Gradu et al. |
| 8,459,619 B2 | 6/2013 | Trinh et al. |
| 8,491,438 B2 | 7/2013 | Kim et al. |
| 8,561,735 B2 | 10/2013 | Morrow et al. |
| 8,696,506 B2 | 4/2014 | Kaltenbach et al. |
| 8,788,162 B2 | 7/2014 | Park |
| 8,795,113 B2 | 8/2014 | Grochowski et al. |
| 8,801,318 B2 | 8/2014 | Knoble et al. |
| 8,818,588 B2 | 8/2014 | Ambrosio et al. |
| 8,864,613 B2 | 10/2014 | Morrow et al. |
| 8,894,526 B2 | 11/2014 | Kozarekar et al. |
| 8,905,892 B1 | 12/2014 | Lee et al. |
| 9,114,699 B2 | 8/2015 | Takei et al. |
| 9,114,804 B1 | 8/2015 | Shukla et al. |
| 9,132,736 B1 | 9/2015 | Shukla et al. |
| 9,428,042 B2 | 8/2016 | Morrow et al. |
| 9,492,695 B2 | 11/2016 | Betz et al. |
| 9,504,863 B2 | 11/2016 | Moore |
| 9,579,530 B2 | 2/2017 | Betz et al. |
| 9,580,962 B2 | 2/2017 | Betz et al. |
| 9,650,032 B2 | 5/2017 | Kotloski et al. |
| 9,651,120 B2 | 5/2017 | Morrow et al. |
| 9,656,659 B2 | 5/2017 | Shukla et al. |
| 9,677,334 B2 | 6/2017 | Aiken et al. |
| 2002/0005304 A1 | 1/2002 | Bachman et al. |

(56) References Cited

U.S. PATENT DOCUMENTS

| | | |
|---|---|---|
| 2002/0045507 A1 | 4/2002 | Bowen |
| 2002/0065594 A1 | 5/2002 | Squires et al. |
| 2003/0130765 A1 | 7/2003 | Pillar et al. |
| 2003/0158635 A1 | 8/2003 | Pillar et al. |
| 2003/0163228 A1 | 8/2003 | Pillar et al. |
| 2003/0163230 A1 | 8/2003 | Pillar et al. |
| 2003/0171854 A1 | 9/2003 | Pillar et al. |
| 2003/0195680 A1 | 10/2003 | Pillar |
| 2003/0200015 A1 | 10/2003 | Pillar |
| 2003/0230443 A1 | 12/2003 | Cramer et al. |
| 2004/0019414 A1 | 1/2004 | Pillar et al. |
| 2004/0024502 A1 | 2/2004 | Squires et al. |
| 2004/0039510 A1 | 2/2004 | Archer et al. |
| 2004/0040775 A1 | 3/2004 | Shimizu et al. |
| 2004/0055802 A1 | 3/2004 | Pillar et al. |
| 2004/0069865 A1 | 4/2004 | Rowe et al. |
| 2004/0133319 A1 | 7/2004 | Pillar et al. |
| 2004/0133332 A1 | 7/2004 | Yakes et al. |
| 2004/0198551 A1 | 10/2004 | Joe et al. |
| 2004/0199302 A1 | 10/2004 | Pillar et al. |
| 2004/0251862 A1 | 12/2004 | Imai |
| 2005/0004733 A1 | 1/2005 | Pillar et al. |
| 2005/0038934 A1 | 2/2005 | Gotze et al. |
| 2005/0113988 A1 | 5/2005 | Nasr et al. |
| 2005/0113996 A1 | 5/2005 | Pillar et al. |
| 2005/0114007 A1 | 5/2005 | Pillar et al. |
| 2005/0119806 A1 | 6/2005 | Nasr et al. |
| 2005/0131600 A1 | 6/2005 | Quigley et al. |
| 2005/0137042 A1 | 6/2005 | Schmidt et al. |
| 2005/0209747 A1 | 9/2005 | Yakes et al. |
| 2005/0234622 A1 | 10/2005 | Pillar et al. |
| 2005/0252703 A1 | 11/2005 | Schmidt et al. |
| 2006/0111213 A1 | 5/2006 | Bucknor et al. |
| 2006/0289212 A1 | 12/2006 | Haruhisa |
| 2007/0021256 A1 | 1/2007 | Klemen et al. |
| 2007/0105678 A1 | 5/2007 | Bucknor et al. |
| 2007/0243966 A1 | 10/2007 | Holmes et al. |
| 2007/0254761 A1 | 11/2007 | Kim |
| 2007/0256870 A1 | 11/2007 | Holmes et al. |
| 2007/0275808 A1 | 11/2007 | Iwanaka et al. |
| 2008/0200296 A1 | 8/2008 | Holmes |
| 2008/0234087 A1 | 9/2008 | Besnard et al. |
| 2008/0269000 A1 | 10/2008 | Abe et al. |
| 2009/0054202 A1 | 2/2009 | Yamakado et al. |
| 2009/0194347 A1 | 8/2009 | Morrow et al. |
| 2009/0209381 A1 | 8/2009 | Ai et al. |
| 2009/0221390 A1 | 9/2009 | Houle |
| 2009/0227409 A1 | 9/2009 | Ito et al. |
| 2009/0227417 A1 | 9/2009 | Imamura et al. |
| 2009/0275437 A1 | 11/2009 | Kersting |
| 2010/0029428 A1 | 2/2010 | Abe et al. |
| 2010/0051361 A1 | 3/2010 | Katsuta et al. |
| 2010/0051367 A1 | 3/2010 | Yamada et al. |
| 2010/0070008 A1 | 3/2010 | Parker et al. |
| 2010/0120579 A1 | 5/2010 | Kawasaki |
| 2010/0121512 A1 | 5/2010 | Takahashi et al. |
| 2010/0138086 A1 | 6/2010 | Imamura et al. |
| 2010/0145589 A1 | 6/2010 | Kobayashi |
| 2010/0179009 A1 | 7/2010 | Wittkopp et al. |
| 2010/0227722 A1 | 9/2010 | Conlon |
| 2010/0261565 A1 | 10/2010 | Ai et al. |
| 2010/0312423 A1 | 12/2010 | Steinhauser et al. |
| 2010/0326752 A1 | 12/2010 | Lamperth |
| 2011/0127095 A1 | 6/2011 | Imamura et al. |
| 2011/0130234 A1 | 6/2011 | Phillips |
| 2011/0143875 A1 | 6/2011 | Ono et al. |
| 2011/0312459 A1 | 12/2011 | Morrow et al. |
| 2011/0319211 A1 | 12/2011 | Si |
| 2012/0022737 A1 | 1/2012 | Kumazaki et al. |
| 2012/0226401 A1 | 9/2012 | Naito |
| 2013/0090202 A1 | 4/2013 | Hiraiwa |
| 2013/0151131 A1 | 6/2013 | Laszio et al. |
| 2013/0196806 A1 | 8/2013 | Morrow et al. |
| 2013/0260936 A1 | 10/2013 | Takei et al. |
| 2013/0296108 A1 | 11/2013 | Ortmann et al. |
| 2014/0094334 A1 | 4/2014 | Tamai et al. |
| 2014/0136035 A1 | 5/2014 | Boskovitch et al. |
| 2014/0141915 A1 | 5/2014 | Naqi et al. |
| 2014/0228168 A1 | 8/2014 | Kaufmann et al. |
| 2014/0229043 A1 | 8/2014 | Frank et al. |
| 2014/0235394 A1 | 8/2014 | Smetana et al. |
| 2014/0243149 A1 | 8/2014 | Holmes et al. |
| 2014/0269145 A1 | 9/2014 | Fasana et al. |
| 2014/0288756 A1 | 9/2014 | Tanaka et al. |
| 2014/0303822 A1 | 10/2014 | Kawamura et al. |
| 2014/0335995 A1 | 11/2014 | Swales et al. |
| 2014/0350803 A1 | 11/2014 | Ye et al. |
| 2014/0357441 A1 | 12/2014 | Supina |
| 2014/0358340 A1 | 12/2014 | Radev |
| 2015/0246331 A1 | 9/2015 | Broker et al. |
| 2015/0283894 A1 | 10/2015 | Morrow et al. |
| 2016/0311253 A1 | 10/2016 | Palmer et al. |

FOREIGN PATENT DOCUMENTS

| | | |
|---|---|---|
| DE | 41 08 647 A1 | 9/1992 |
| DE | 41 34 160 A1 | 4/1993 |
| DE | 44 31 929 C1 | 10/1995 |
| DE | 19749074 A1 | 5/1999 |
| DE | 19851436 A1 | 5/2000 |
| DE | 10 2013 006 028 A1 | 10/2014 |
| EP | 0 791 506 A2 | 8/1997 |
| EP | 0 622 264 B1 | 11/1998 |
| EP | 0 898 213 A1 | 2/1999 |
| EP | 0 925 981 A2 | 6/1999 |
| EP | 1 018 451 A1 | 7/2000 |
| EP | 0 805 059 B1 | 8/2000 |
| EP | 1 092 406 A2 | 4/2001 |
| EP | 0 564 943 B1 | 6/2001 |
| EP | 1 142 744 A1 | 10/2001 |
| EP | 0 812 720 B1 | 12/2001 |
| EP | 1 229 636 A2 | 8/2002 |
| EP | 0 937 600 B1 | 12/2005 |
| FR | 2658259 A1 | 8/1991 |
| GB | 1 308 318 | 2/1973 |
| GB | 2 302 850 A | 2/1997 |
| GB | 2 346 124 A | 8/2000 |
| JP | 60-216703 A | 10/1985 |
| JP | 2010-070008 A | 4/2010 |
| WO | WO-98/19875 A1 | 5/1998 |
| WO | WO-00/30235 A1 | 5/2000 |
| WO | WO-01/54939 A2 | 8/2001 |
| WO | WO-03/055714 A1 | 7/2003 |
| WO | WO-03/093046 A2 | 11/2003 |
| WO | WO-2014/090483 A1 | 6/2014 |
| WO | WO-2014/090486 A1 | 6/2014 |
| WO | WO-2014/102030 A1 | 7/2014 |
| WO | WO-2014/140096 A1 | 9/2014 |
| WO | WO-2014/158078 A1 | 10/2014 |
| WO | WO-2014/166723 A1 | 10/2014 |
| WO | WO-2016/133557 | 8/2016 |

OTHER PUBLICATIONS

U.S. Appl. No. 09/510,547, filed Feb. 22, 2000, Oshkosh Truck Corporation.

U.S. Appl. No. 14/155,145, filed Jan. 14, 2014, Oshkosh Corporation.

U.S. Appl. No. 14/155,224, filed Jan. 14, 2014, Oshkosh Corporation.

U.S. Appl. No. 14/514,210, filed Oct. 14, 2014, Oshkosh Corporation.

U.S. Appl. No. 14/552,240, filed Nov. 24, 2014, Oshkosh Corporation.

U.S. Appl. No. 14/552,252, filed Nov. 24, 2014, Oshkosh Corporation.

U.S. Appl. No. 14/552,275, filed Nov. 24, 2014, Oshkosh Corporation.

U.S. Appl. No. 14/552,283, filed Nov. 24, 2014, Oshkosh Corporation.

U.S. Appl. No. 14/552,293, filed Nov. 24, 2014, Oshkosh Corporation.

(56) References Cited

OTHER PUBLICATIONS

U.S. Appl. No. 14/624,285, filed Feb. 17, 2015, Oshkosh Corporation.
U.S. Appl. No. 14/635,948, filed Mar. 2, 2015, Oshkosh Corporation.
U.S. Appl. No. 14/693,479, filed Apr. 22, 2015, Oshkosh Corporation.
U.S. Appl. No. 14/792,532, filed Jul. 6, 2015, Oshkosh Corporation.
U.S. Appl. No. 14/792,535, filed Jul. 6, 2015, Oshkosh Corporation.
Bose, et al., "High Frequency AC vs. DC Distribution System for Next Generation Hybrid Electric Vehicle," Industrial Electronics, Control and Instrumentation, Proceedings of the 1996 IEEE IECON 22nd International Conference on Taipei, Taiwan, New York, New York, pp. 706-712 Aug. 5-10, 1996.
European Search Report based on European Application No. EP 0724300, date of completion of the search Jul. 4, 2005, 2 pages.
Dana Spicer Central Tire Inflation System Specifications, Dana Corporation, Kalamazoo, Michigan, 2 pages, May 2000.
Diesel Locomotive Technology, http://www.railway-technical.com/diesel.shtml, available by Jan. 24, 2012, 15 pages.
International Search Report and Written Opinion for PCT Application No. PCT/US2015/050518, dated Feb. 9, 2016, 18 pages.
International Search Report and Written Opinion for PCT Application No. PCT/US2016/038587, dated Nov. 10, 2016, 15 pages.
International Search Report and Written Opinion for PCT Application PCT/US2016/038586, dated Oct. 21, 2016, 14 pages.
International Search Report for PCT Application No. PCT/US2011/041089, dated Dec. 19, 2011, 6 pages.
Khan, I.A., Automotive Electrical Systems: Architecture and Components, Digital Avionics Systems Conference, IEEE, pp. 8.C.5-1-8.C.5-10, 1999.
Miller, Hybrid Electric Vehicle Propulsion System Architectures of the e-CVT Type, IEEE Transactions on Power Electronics, vol. 21, No. 3, May 2006, 12 pages.
Namuduri, et al., High Power Density Electric Drive for an Hybrid Vehicle, Applied Power Electronics Conference and Exposition, pp. 34-40, Feb. 15, 1998.
Rajashekara, K., History of Electric Vehicles in General Motors, Industry Applications Society Annual Meeting, pp. 447-454, Oct. 2-8, 1993.
Shigley et al., Theory of Machines and Mechanisms, complete text, McGraw-Hill Book Company, published in the United States, 297 pages, 1980.

MULTI-MODE ELECTROMECHANICAL VARIABLE TRANSMISSION

CROSS-REFERENCE TO RELATED PATENT APPLICATIONS

This application is a continuation of U.S. application Ser. No. 15/601,670, filed May 22, 2017, which is a continuation of U.S. application Ser. No. 14/792,535, filed Jul. 6, 2015, now U.S. Pat. No. 9,656,659, which is a continuation-in-part of U.S. application Ser. No. 14/624,285, filed Feb. 17, 2015, now U.S. Pat. No. 9,651,120, all of which are incorporated herein by reference in their entireties.

BACKGROUND

Internal combustion engine vehicles, hybrid vehicles, and electric vehicles, among other types of vehicles, include transmissions. Traditional vehicle transmissions use gears and gear trains to provide speed and torque conversions from a rotating power source (e.g., an engine, a motor, etc.) to another device (e.g., a drive shaft, wheels of a vehicle, etc.). Transmissions include multiple gear ratios selectively coupled to the rotating power source with a mechanism that may also selectively couple an output to the various gear ratios.

SUMMARY

One exemplary embodiment relates to a vehicle that includes a drive axle, a multi-mode transmission, and a controller coupled to the multi-mode transmission. The multi-mode transmission includes a first gear set having a first planetary gear carrier and a second gear set having a second planetary gear carrier, a first motor/generator coupled to the first gear set, a second motor/generator coupled to the second gear set and selectively coupled to a connecting shaft, a brake positioned to selectively limit a rotational movement of a ring gear of the second gear set when engaged, a first clutch selectively rotationally coupling the first gear set and the second gear set to the drive axle when engaged, and a second clutch selectively rotationally coupling the second motor/generator to the connecting shaft when engaged. The controller is configured to engage the second clutch, the brake, and the first clutch to selectively reconfigure the multi-mode transmission to an intermediate shift mode of operation.

Another exemplary embodiment relates to a drive system for a vehicle that includes a first gear set having a first sun gear, a first ring gear, a first plurality of planetary gears coupling the first sun gear to the first ring gear, and a first carrier rotationally supporting the first plurality of planetary gears, a second gear set having a second sun gear, a second ring gear, a second plurality of planetary gears coupling the second sun gear to the second ring gear, and a second carrier rotationally supporting the second plurality of planetary gears, a first electrical machine coupled to the first gear set, a second electrical machine coupled to the second gear set, a connecting shaft coupled to the first gear set, a brake positioned to selectively limit a rotational movement of the second gear set when engaged, a first clutch selectively rotationally coupling the first carrier and the second carrier to a driveshaft output of the vehicle when engaged, and a second clutch selectively rotationally coupling the second electrical machine to the connecting shaft when engaged. The drive system is selectively reconfigurable into an intermediate shift mode of operation, in which the brake, the first clutch, and the second clutch are engaged.

Another exemplary embodiment relates to a method of operating a multi-mode transmission of a vehicle. The method includes engaging a brake and first clutch of the multi-mode transmission to configure the multi-mode transmission into a first mode of operation whereby a first electromagnetic device is coupled to a connecting shaft, the first clutch coupling a pair of carriers of a first planetary gear set and a second planetary gear set to a driveshaft output of the vehicle when engaged, engaging a second clutch of the multi-mode transmission to couple the connecting shaft and a second electromagnetic device, thereby configuring the multi-mode transmission into an intermediate shift mode, and at least one of (i) disengaging the brake to complete a reconfiguration of the multi-mode transmission into a second mode of operation and (ii) disengaging the second clutch to revert the multi-mode transmission into the first mode of operation from the intermediate shift mode.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures.

It should also be understood that the terminology is for the purpose of description only and should not be regarded as limiting.

According to an exemplary embodiment, a multi-mode electromechanical variable transmission is provided as part of a vehicle and is selectively reconfigurable into one of a plurality of operating modes. The vehicle may also include an engine, a first electromagnetic device, and second electromagnetic device. In one embodiment, at least one of the first electromagnetic device and the second electromagnetic device provides rotational mechanical energy to start the engine. In another embodiment, the engine provides a rotational mechanical energy input to both the first and second electromagnetic devices such that each operates as a generator to generate electrical energy. In still other embodiments, one of the first electromagnetic device and the second electromagnetic device are configured to receive a rotational mechanical energy output from at least one of the engine and the multi-mode electromechanical variable transmission and provide an electrical energy output to power a control system and/or the other electromagnetic device.

Figure 1:
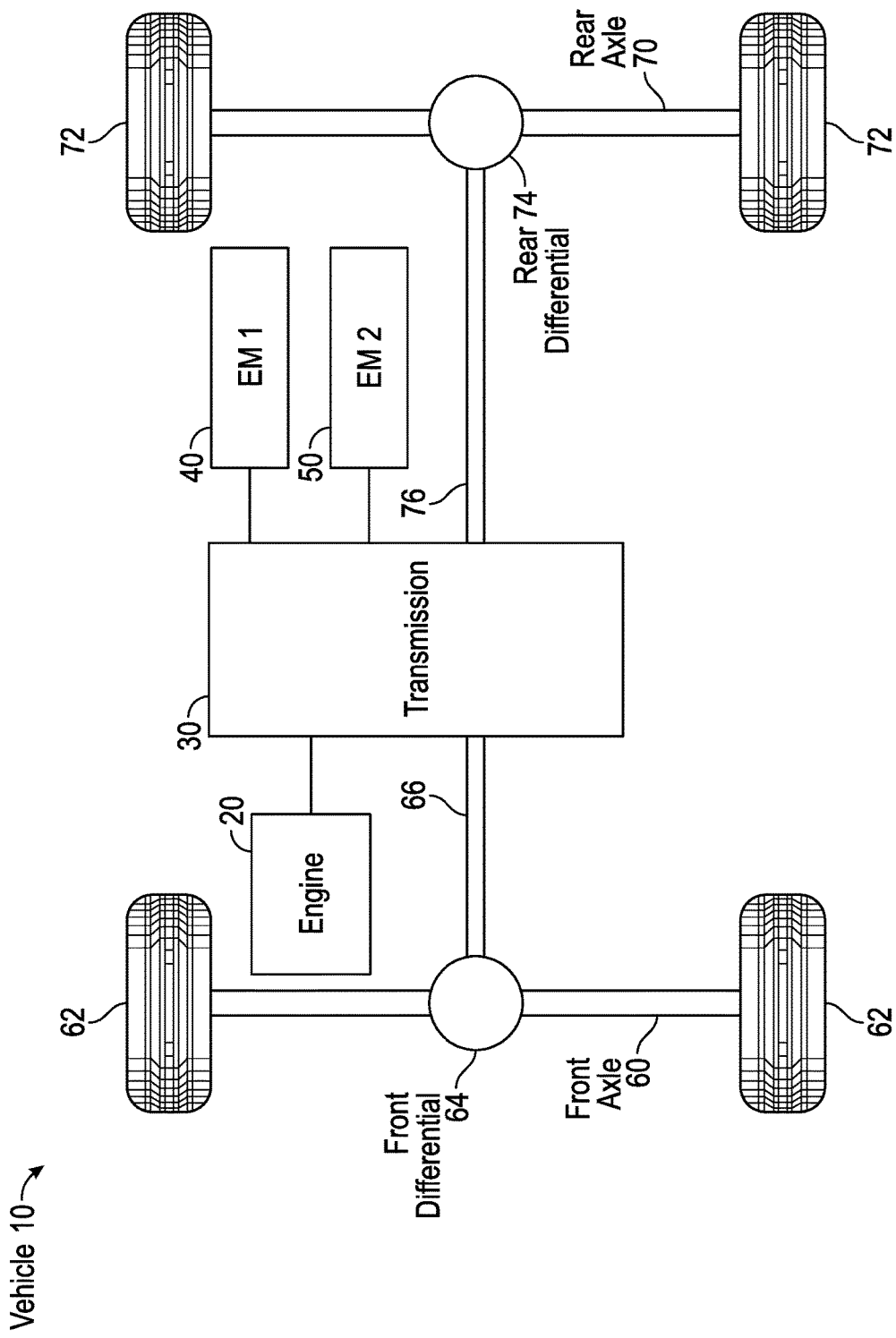
FIG. 1 is a schematic view of a drive train for a vehicle, according to an exemplary embodiment.
Figure 2:
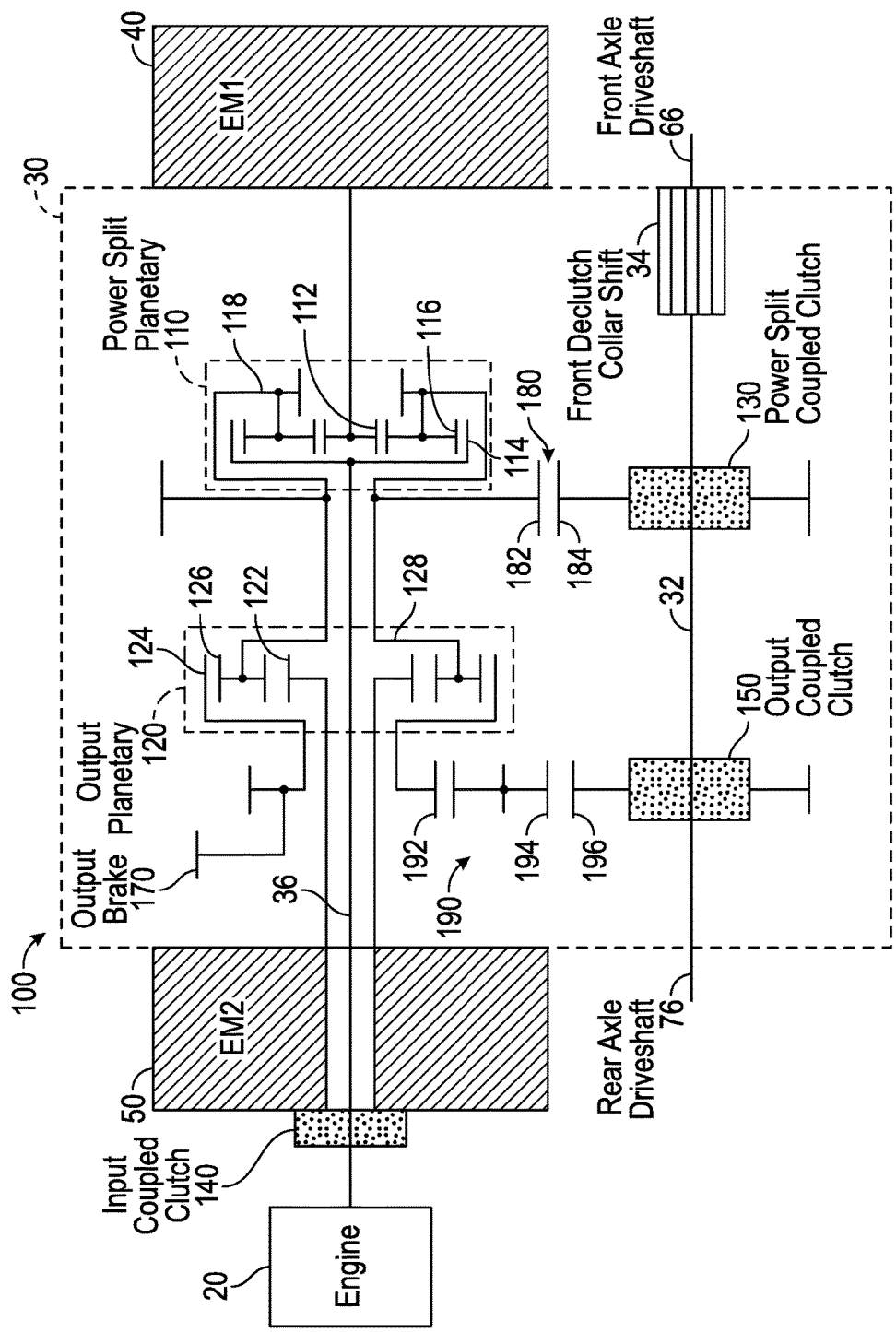
FIG. 2 is a detailed schematic view of the drive train of FIG. 1, according to an exemplary embodiment.

According to the exemplary embodiment shown in FIGS. 1-2, a vehicle 10 includes an engine 20 coupled to a transmission, shown as transmission 30. In one embodiment, engine 20 is configured to combust fuel and provide a mechanical energy input to transmission 30. By way of example, engine 20 may be configured to provide a rotational mechanical energy input to transmission 30. As shown in FIGS. 1-2, a first electrical machine, electromagnetic device and/or motor/generator, shown as first electromagnetic device 40, and a second electrical machine, electromagnetic device and/or motor/generator, shown as second electromagnetic device 50, are coupled to transmission 30.

Referring again to the exemplary embodiment shown in FIG. 1, vehicle 10 includes a front axle, shown as front axle 60, and a rear axle, shown as rear axle 70. As shown in FIG. 1, front axle 60 includes a pair of tractive elements, shown as tires 62, coupled to a front differential, shown as front differential 64. Rear axle 70 includes a pair of tractive elements, shown as tires 72, coupled to a rear differential, shown as rear differential 74, according to an exemplary embodiment. According to the exemplary embodiment shown in FIG. 1, front differential 64 is coupled to transmission 30 with a front axle driveshaft 66 and rear differential 74 is coupled to transmission 30 with a rear axle driveshaft 76. While shown as coupled to tires 62 and tires 72, front differential 64 and rear differential 74 may be coupled to various other types of tractive elements (e.g., tracks, etc.), according to alternative embodiments. As shown in FIG. 1, front axle driveshaft 66 and rear axle driveshaft 76 are configured to transport power from first electromagnetic device 40, second electromagnetic device 50, and engine 20 to tires 62 and tires 72, respectively. Vehicle 10 may include a plurality of front differentials 64 that may be coupled or a plurality of rear differentials 74 that may be coupled, according to various alternative embodiments.

Engine 20 may be any source of rotational mechanical energy that is derived from a stored energy source. The stored energy source is disposed onboard vehicle 10, according to an exemplary embodiment. The stored energy source may include a liquid fuel or a gaseous fuel, among other alternatives. In one embodiment, engine 20 includes an internal combustion engine configured to be powered by at least one of gasoline, natural gas, and diesel fuel. According to various alternative embodiments, engine 20 includes at least one of a turbine, a fuel cell, an electric motor or still another device. According to one exemplary embodiment, engine 20 includes a twelve liter diesel engine capable of providing between approximately 400 horsepower and approximately 600 horsepower and between approximately 400 foot pounds of torque and approximately 2000 foot pounds of torque. In one embodiment, engine 20 has a rotational speed (e.g., a rotational operational range, etc.) of between 0 and 2,100 revolutions per minute. Engine 20 may be operated at a relatively constant speed (e.g., 1,600 revolutions per minute, etc.). In one embodiment, the relatively constant speed is selected based on an operating condition of engine 20 (e.g., an operating speed relating to a point of increased fuel efficiency, etc.).

In one embodiment, at least one of first electromagnetic device 40 and second electromagnetic device 50 provide a mechanical energy input to transmission 30. By way of example, at least one of first electromagnetic device 40 and second electromagnetic device 50 may be configured to provide a rotational mechanical energy input to transmission 30 (i.e., at least one of first electromagnetic device 40 and second electromagnetic device 50 may operate as a motor, etc.). At least one of first electromagnetic device 40 and second electromagnetic device 50 may receive a mechanical energy output from at least one of engine 20 and transmission 30. By way of example, at least one of first electromagnetic device 40 and second electromagnetic device 50 may be configured to receive a rotational mechanical energy output from at least one of engine 20 and transmission 30 and provide an electrical energy output (i.e., at least one of first electromagnetic device 40 and second electromagnetic device 50 may operate as a generator, etc.). According to an exemplary embodiment, first electromagnetic device 40 and second electromagnetic device 50 are capable of both providing mechanical energy and converting a mechanical energy input into an electrical energy output (i.e., operate as a motor and a generator, etc.). The operational condition of first electromagnetic device 40 and second electromagnetic device 50 (e.g., as a motor, as a generator, etc.) may vary based on a mode of operation associated with transmission 30.

According to the exemplary embodiment shown in FIG. 2, a drive system for a vehicle, shown as drive system 100, includes engine 20, transmission 30, first electromagnetic device 40, second electromagnetic device 50, front axle driveshaft 66, and rear axle driveshaft 76. As shown in FIG. 2, transmission 30 includes a first gear set, shown as power split planetary 110, and a second gear set, shown as output planetary 120. In one embodiment, power split planetary 110 and output planetary 120 are disposed between first electromagnetic device 40 and second electromagnetic device 50. In an alternative embodiment, one or both of power split planetary 110 and output planetary 120 are positioned outside of (i.e., not between, etc.) first electromagnetic device 40 and second electromagnetic device 50. As shown in FIG. 2, power split planetary 110 is directly coupled to engine 20.

Referring to the exemplary embodiment shown in FIG. 2, power split planetary 110 is a planetary gear set that includes a sun gear 112, a ring gear 114, and a plurality of planetary gears 116. The plurality of planetary gears 116 couple sun gear 112 to ring gear 114, according to an exemplary embodiment. As shown in FIG. 2, a carrier 118 rotationally supports the plurality of planetary gears 116. In one embodiment, first electromagnetic device 40 is directly coupled to sun gear 112 such that power split planetary 110 is coupled to first electromagnetic device 40. By way of example, first electromagnetic device 40 may include a shaft (e.g., a first shaft, an input shaft, an output shaft, etc.) directly coupled to sun gear 112.

Referring still to the exemplary embodiment shown in FIG. 2, output planetary 120 is a planetary gear set that includes a sun gear 122, a ring gear 124, and a plurality of planetary gears 126. The plurality of planetary gears 126 couple sun gear 122 to ring gear 124, according to an exemplary embodiment. As shown in FIG. 2, a carrier 128 rotationally supports the plurality of planetary gears 126. In one embodiment, second electromagnetic device 50 is directly coupled to sun gear 122 such that output planetary 120 is coupled to second electromagnetic device 50. By way of example, second electromagnetic device 50 may include a shaft (e.g., a second shaft, an input shaft, an output shaft, etc.) directly coupled to sun gear 122. Carrier 118 is directly coupled to carrier 128, thereby coupling power split planetary 110 to output planetary 120, according to the exemplary embodiment shown in FIG. 2. In one embodiment, directly coupling carrier 118 to carrier 128 synchronizes rotational speeds of carrier 118 and carrier 128.

According to an exemplary embodiment, transmission 30 includes a first clutch, shown as power split coupled clutch 130. In one embodiment, power split coupled clutch 130 is positioned downstream of power split planetary 110 (e.g., between power split planetary 110 and front axle driveshaft 66 or rear axle driveshaft 76, etc.). In an alternative embodiment, power split coupled clutch 130 is directly coupled to engine 20. As shown in FIG. 2, power split coupled clutch 130 is positioned to selectively couple power split planetary 110 and output planetary 120 with a shaft, shown as output shaft 32. In one embodiment, power split coupled clutch 130 allows a vehicle to be towed without spinning the gears within transmission 30 (e.g., power split planetary 110, output planetary 120, etc.). Output shaft 32 may be coupled to rear axle driveshaft 76 and selectively coupled to front axle driveshaft with a declutch assembly, shown as front declutch collar shift 34. Front declutch collar shift 34 may be engaged and disengaged to selectively couple front axle driveshaft 66 to output shaft 32 of transmission 30 (e.g., to facilitate operation of a vehicle in a rear-wheel-drive-only mode, an all-wheel-drive mode, a four-wheel-drive mode, etc.).

As shown in FIG. 2, transmission 30 includes a second clutch, shown as input coupled clutch 140. Input coupled clutch 140 is positioned to selectively couple second electromagnetic device 50 with engine 20, according to an exemplary embodiment. Input coupled clutch 140 may thereby selectively couple engine 20 to output planetary 120. As shown in FIG. 2, transmission 30 includes a shaft, shown as connecting shaft 36. According to an exemplary embodiment, connecting shaft 36 extends from engine 20, through second electromagnetic device 50, and through output planetary 120 to power split planetary 110. Connecting shaft 36 couples engine 20 with power split planetary 110, according to the exemplary embodiment shown in FIG. 2. In one embodiment, connecting shaft 36 directly couples engine 20 with ring gear 114 of power split planetary 110. Input coupled clutch 140 may selectively couple second electromagnetic device 50 with connecting shaft 36. According to an exemplary embodiment, the shaft (e.g., input/output shaft, etc.) of first electromagnetic device 40 and the shaft (e.g., input/output shaft, etc.) of second electromagnetic device 50 are radially aligned with power split planetary 110, output planetary 120, and connecting shaft 36 (e.g., centerlines thereof are aligned, etc.). As shown in FIG. 2, transmission 30 includes a third clutch, shown as output coupled clutch 150. Output coupled clutch 150 is positioned to selectively couple output planetary 120 with output shaft 32, according to an exemplary embodiment. In one embodiment, output shaft 32 is radially offset from power split planetary 110, output planetary 120, and connecting shaft 36 (e.g., radially offset from centerlines thereof, etc.).

Referring again to the exemplary embodiment shown in FIG. 2, transmission 30 includes brake, shown as output brake 170. Output brake 170 is positioned to selectively inhibit the movement of at least a portion of output planetary 120 (e.g., ring gear 124, etc.), according to an exemplary embodiment. In one embodiment, output brake 170 is biased into an engaged position (e.g., with a spring, etc.) and selectively disengaged (e.g., with application of pressurized hydraulic fluid, etc.). In other embodiments, output brake 170 is hydraulically-biased and spring released. In still other embodiments, the components of transmission 30 are still otherwise engaged and disengaged (e.g., pneumatically, etc.). By way of example, output brake 170 and output coupled clutch 150 may be engaged simultaneously to function as a driveline brake (e.g., a braking mechanism to slow down a vehicle, etc.).

As shown in FIG. 2, transmission 30 includes a gear set 180 that couples carrier 118 and carrier 128 to output shaft 32. In one embodiment, gear set 180 includes a first gear, shown as gear 182, in meshing engagement with a second gear, shown as gear 184. As shown in FIG. 2, gear 182 is rotatably coupled to carrier 118 and carrier 128. By way of example, gear 182 may be fixed to a component (e.g., shaft, tube, etc.) that couples carrier 118 and carrier 128. As shown in FIG. 2, power split coupled clutch 130 is positioned to selectively couple gear 184 with output shaft 32 when engaged. With power split coupled clutch 130 disengaged, relative movement (e.g., rotation, etc.) may occur between gear 184 and output shaft 32.

According to an exemplary embodiment, transmission 30 includes a gear set, shown as gear set 190, that couples output planetary 120 to output shaft 32. As shown in FIG. 2, gear set 190 includes a first gear, shown as gear 192, coupled to ring gear 124 of output planetary 120. Gear 192 is in meshing engagement with a second gear, shown as gear 194, according to an exemplary embodiment. As shown in FIG. 2, gear 194 is coupled to a third gear, shown as gear 196. In other embodiments, gear 192 is directly coupled with gear 196. By way of example, gear set 190 may not include gear 194, and gear 192 may be directly coupled to (e.g., in meshing engagement with, etc.) gear 196. As shown in FIG. 2, output coupled clutch 150 is positioned to selectively couple gear 196 with output shaft 32 when engaged. With output coupled clutch 150 disengaged, relative movement (e.g., rotation, etc.) may occur between gear 196 and output shaft 32. By way of example, output coupled clutch 150 may be engaged to couple ring gear 124 to output shaft 32. Output brake 170 is positioned to selectively limit the movement of gear 192 when engaged to thereby also limit the movement of ring gear 124, gear 194, and gear 196.

Figure 3:
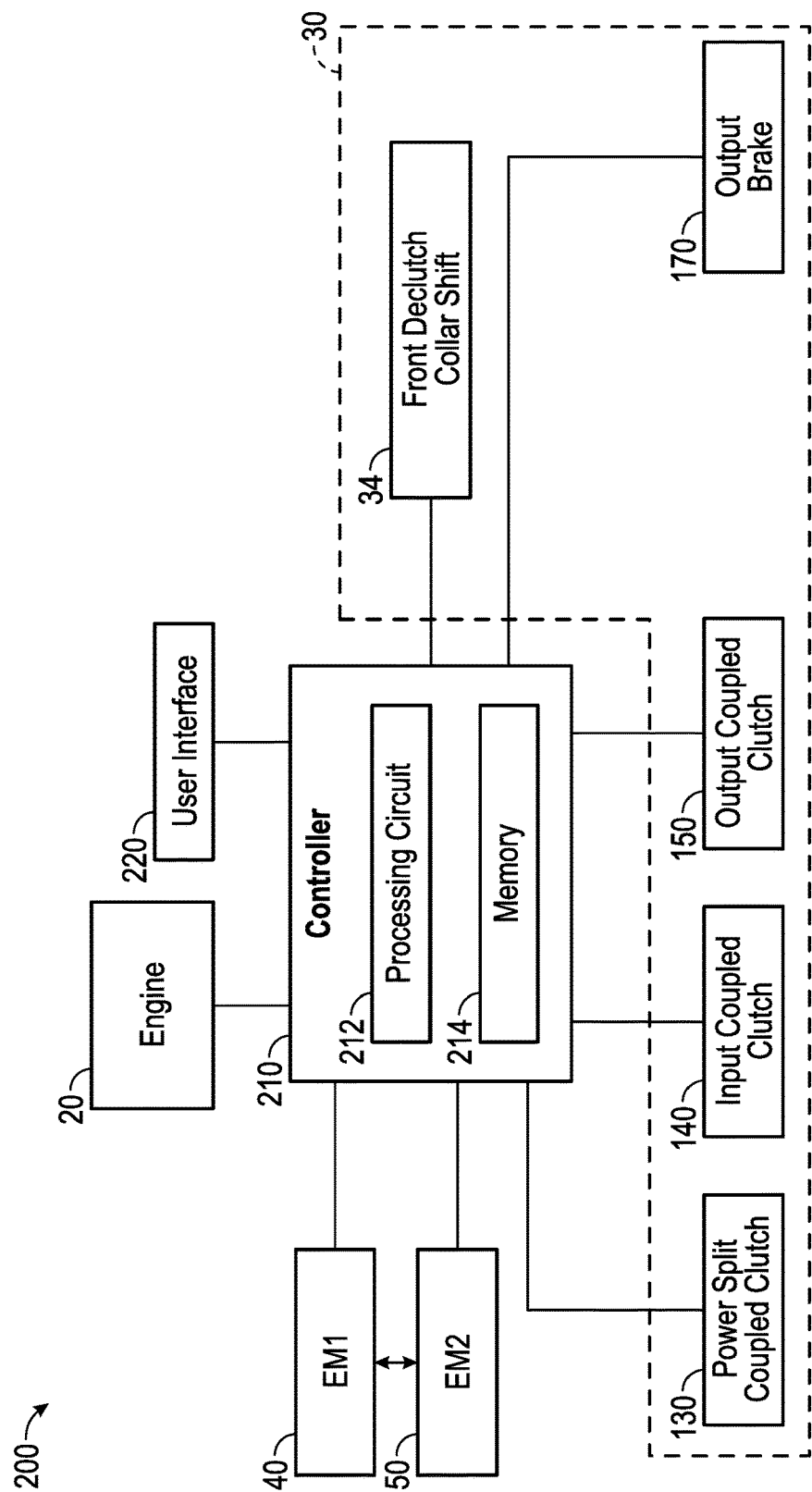
FIG. 3 is a schematic diagram of a control system for the drive train of FIG. 1, according to an exemplary embodiment.

According to the exemplary embodiment shown in FIG. 3, a control system 200 for a vehicle includes a controller 210. In one embodiment, controller 210 is configured to selectively engage, selectively disengage, or otherwise communicate with components of the vehicle according to various modes of operation. As shown in FIG. 3, controller 210 is coupled to engine 20. In one embodiment, controller 210 is configured to selectively engage engine 20 (e.g., interface with a throttle of, etc.) such that an output of engine 20 spins at a target rate. Controller 210 is coupled to first electromagnetic device 40 and second electromagnetic device 50, according to an exemplary embodiment, and may send and receive signals therewith. By way of example, controller 210 may send command signals relating to at least one of a target rotational speed and a target rotation direction for first electromagnetic device 40 and second electromagnetic device 50. As shown in FIG. 3, first electromagnetic device 40 and second electromagnetic device 50 are electrically coupled. By way of example, power generated by first electromagnetic device 40 may be utilized by second electromagnetic device 50 (e.g., to provide an output torque as a motor, etc.), or power generated by second electromagnetic device 50 may be utilized by first electromagnetic device 40 (e.g., to provide an output torque as a motor, etc.).

According to the exemplary embodiment shown in FIG. 3, control system 200 includes a user interface 220 that is coupled to controller 210. In one embodiment, user interface 220 includes a display and an operator input. The display may be configured to display a graphical user interface, an image, an icon, or still other information. In one embodiment, the display includes a graphical user interface configured to provide general information about the vehicle (e.g., vehicle speed, fuel level, warning lights, etc.). The graphical user interface may also be configured to display a current mode of operation, various potential modes of operation, or still other information relating to transmission 30 or drive system 100. By way of example, the graphical user interface may be configured to provide specific information regarding the operation of drive system 100 (e.g., whether power split coupled clutch 130, input coupled clutch 140, output coupled clutch 150, and output brake 170 are engaged or disengaged, a fault condition where at least one of power split coupled clutch 130, input coupled clutch 140, output coupled clutch 150, and output brake 170 fail to engage or disengage in response to a command signal, etc.).

The operator input may be used by an operator to provide commands to at least one of engine 20, transmission 30, first electromagnetic device 40, second electromagnetic device 50, and drive system 100 or still another component of the vehicle. The operator input may include one or more buttons, knobs, touchscreens, switches, levers, or handles. In one embodiment, an operator may press a button to change the mode of operation for at least one of transmission 30, and drive system 100, and the vehicle. The operator may be able to manually control some or all aspects of the operation of transmission 30 using the display and the operator input. It should be understood that any type of display or input controls may be implemented with the systems and methods described herein.

Controller 210 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 3, controller 210 includes a processing circuit 212 and a memory 214. Processing circuit 212 may include an ASIC, one or more FPGAs, a DSP, circuits containing one or more processing components, circuitry for supporting a microprocessor, a group of processing components, or other suitable electronic processing components. In some embodiments, processing circuit 212 is configured to execute computer code stored in memory 214 to facilitate the activities described herein. Memory 214 may be any volatile or non-volatile computer-readable storage medium capable of storing data or computer code relating to the activities described herein. According to an exemplary embodiment, memory 214 includes computer code modules (e.g., executable code, object code, source code, script code, machine code, etc.) configured for execution by processing circuit 212. Memory 214 includes various actuation profiles corresponding to modes of operation (e.g., for transmission 30, for drive system 100, for a vehicle, etc.), according to an exemplary embodiment. In some embodiments, controller 210 may represent a collection of processing devices (e.g., servers, data centers, etc.). In such cases, processing circuit 212 represents the collective processors of the devices, and memory 214 represents the collective storage devices of the devices.

Referring next to the exemplary embodiments shown in FIGS. 4-10, transmission 30 is configured to operate according to a plurality of modes of operation. Various modes of operation for transmission 30 are identified below in Table 1. In other embodiments, a vehicle having transmission 30 is configured to operate according to the various modes of operation shown in FIGS. 4-10 and identified below in Table 1.

TABLE 1

| Mode of Operation | Power Split Coupled Clutch 130 | Output Coupled Clutch 150 | Output Brake 170 | Input Coupled Clutch 140 |
|---|---|---|---|---|
| High Speed Reverse | X | | X | |
| Low Speed Reverse | X | X | | |
| Vehicle Start | | | X | X |
| Low Range | X | X | | |
| Mid Range | X | | X | |
| Shift | X | | X | X |
| High Range | X | | | X |

As shown in Table 1, an "X" represents a component of drive system 100 (e.g., output brake 170, power split coupled clutch 130, etc.) that is engaged or closed during the respective modes of operation. In one embodiment, all of the components in Table 1 are disengaged to selectively reconfigure transmission 30 in a neutral mode.

Figure 4:
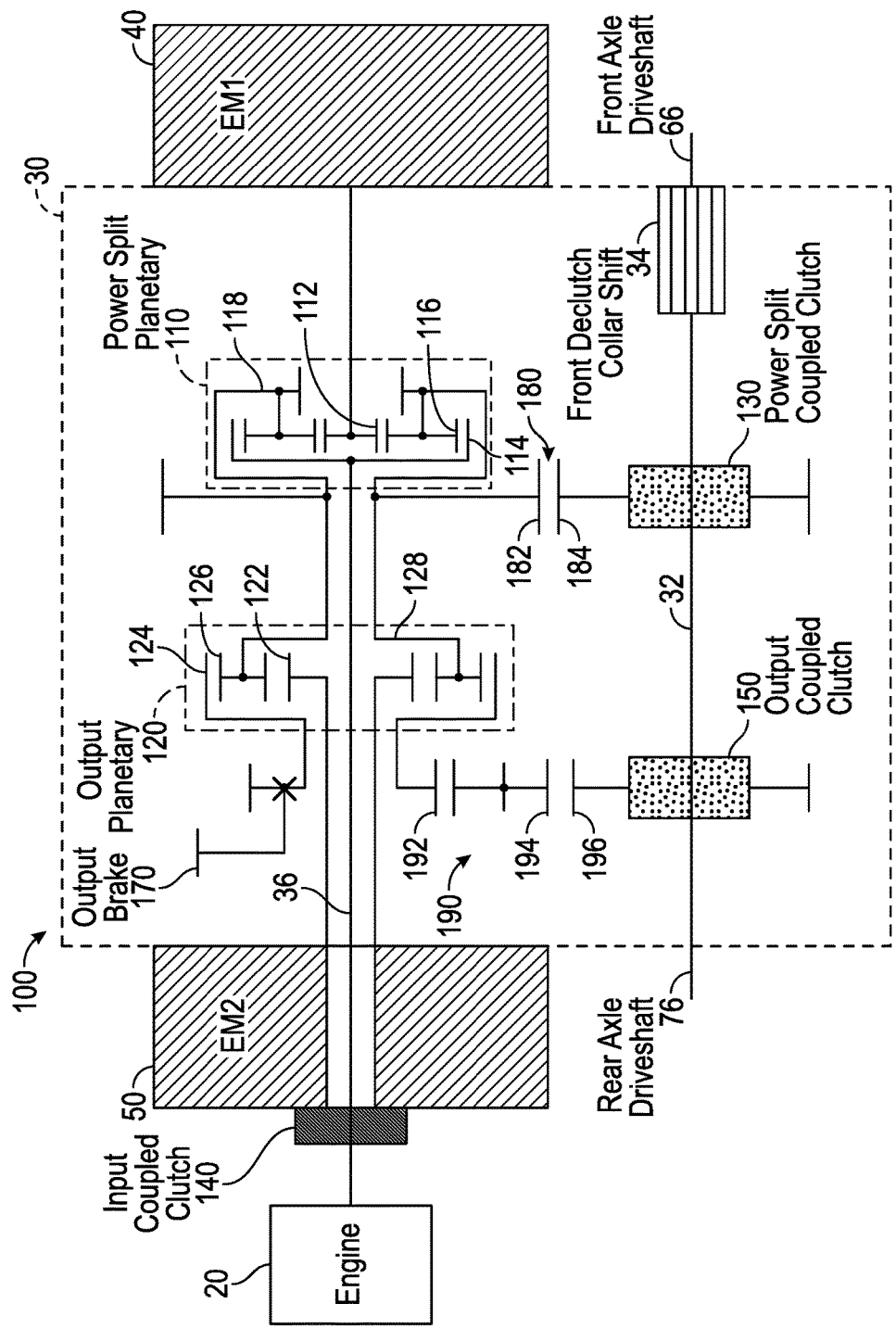
FIG. 4 is a detailed schematic view of a drive train configured in a startup mode of operation, according to an exemplary embodiment.

As shown in FIG. 4, transmission 30 is selectively reconfigured into an active neutral startup mode of operation (e.g., a vehicle start mode of operation, an active neutral mode of operation, etc.). Controller 210 may selectively configure transmission 30 into the active neutral startup mode of operation in response to a vehicle start request and/or an engine start request. Controller 210 may selectively configure transmission 30 into the active neutral startup mode of operation from a passive neutral mode of operation (e.g., a mode whereby engine 20 is running but does not provide an output torque to tires 62 and/or tires 72, etc.). In one embodiment, controller 210 first selectively configures transmission 30 into the passive neutral mode of operation (e.g., by starting engine 20, etc.) and thereafter selectively configure transmission 30 into the active neutral startup mode of operation in response to the vehicle start request and/or the engine start request. Transmission 30 may be reconfigured into the passive neutral mode of operation at various times during the operation of the vehicle (e.g., when entering a park mode of operation from a driving mode of operation, in order to tow the vehicle, etc.).

In one embodiment, engine 20 includes a traditional starting mechanism (e.g., a starter motor, etc.) configured to start engine 20 (e.g., in response to a vehicle start request, in response to an engine start request, etc.). The vehicle start request and/or the engine start request may include a directive to turn the engine "on" from an "off" state. The vehicle may include at least one of a pushbutton, a graphical user interface, an ignition, and another device with which a user interacts to provide or trigger the vehicle start request and/or the engine start request. In other embodiments, the vehicle start request and/or the engine start request is generated by an autonomous control system configured to command the vehicle or engine to turn "on" from an "off" state. Controller 210 may provide a signal to first start engine 20 and thereafter selectively configure transmission 30 into the active neutral startup mode of operation in response to a vehicle start request and/or an engine start request.

In the active neutral startup mode of operation, engine 20 may provide a rotational mechanical energy input to at least one of first electromagnetic device 40 and second electromagnetic device 50. In one embodiment, first electromagnetic device 40 is coupled to second electromagnetic device 50 with a bus. The bus may include an electrical connection, and a voltage produced by first electromagnetic device 40 in response to the rotational input from engine 20 may be applied to the bus. First electromagnetic device 40 may produce a voltage that is applied to the bus when transmission 30 is configured in the active neutral startup mode of operation. In another embodiment, the at least one of first electromagnetic device 40 and second electromagnetic device 50 may provide a startup power in response to a rotational input from engine 20.

In the active neutral startup mode of operation, engine 20 powers at least one of the first electromagnetic device 40 and second electromagnetic device 50, which is brought up to a threshold level (e.g., a threshold speed, a threshold speed for a target period of time, performance that provides a threshold power generation, performance that provides a threshold power generation for a target period of time, performance that provides a threshold startup power, etc.). The threshold level may relate to a requisite DC bus voltage needed to activate at least one of first electromagnetic device 40 and second electromagnetic device 50. The power electronics of control system 200 that control the motor-to-motor functions may be brought online during the active neutral startup mode. In one embodiment, controller 210 activates first electromagnetic device 40 and/or second electromagnetic device 50 within and/or to a desired state in response to first electromagnetic device 40 operating at the threshold level. In another embodiment, controller 210 disengages at least one of input coupled clutch 140 and output brake 170 in response to first electromagnetic device 40 operating at the threshold level.

According to an exemplary embodiment, transmission 30 is selectively reconfigured into the active neutral startup mode during an initial start of engine 20 (e.g., when engine is turned "on" from an "off" state, etc.). The active neutral startup mode may differ from other neutral modes of operation associated with the vehicle (e.g., in non-startup conditions, etc.), where first electromagnetic device 40 and second electromagnetic device 50 are already actuatable into a desired state and/or otherwise online.

In an alternative embodiment, at least one of first electromagnetic device 40 and second electromagnetic device 50 include and/or are coupled an energy storage device (e.g., a capacitor, a battery, etc.) configured to store energy (e.g., electrical energy, chemical energy, etc.) associated with drive system 100. In one embodiment, rotation of first electromagnetic device 40 rotates connecting shaft 36 to start engine 20. By way of example, first electromagnetic device 40 may be configured to use the stored energy to start engine 20 by providing a rotational mechanical energy input (e.g., a torque, etc.) to engine 20 via connecting shaft 36. In another embodiment, rotation of second electromagnetic device 50 rotates connecting shaft 36 (e.g., where input coupled clutch 140 is engaged, etc.) to start engine 20. By way of example, second electromagnetic device 50 may be configured to use the stored energy to start engine 20 by providing a rotational mechanical energy input (e.g., a torque, etc.) to engine 20 through the engagement of input coupled clutch 140 with connecting shaft 36. Such an active neutral startup mode may be used to start engine 20, establish a requisite DC bus voltage, and/or otherwise export power without relying on controller 210 to engage first electromagnetic device 40 and/or second electromagnetic device 50.

As shown in FIG. 4 and Table 1, input coupled clutch 140 and output brake 170 are engaged when transmission 30 is configured in the active neutral startup mode. As shown in FIG. 4, input coupled clutch 140 directly couples second electromagnetic device 50 to connecting shaft 36 and engine 20. Output brake 170 rotationally fixes ring gear 124. When engine 20 provides a rotational mechanical energy input to transmission 30, connecting shaft 36 drives both power split planetary 110 (e.g., directly, etc.) and output planetary 120 (e.g., through second electromagnetic device 50, etc.). According to the exemplary embodiment shown in FIG. 4, an energy flow path for the active neutral startup mode includes: engine 20 providing a rotational mechanical energy input to connecting shaft 36; connecting shaft 36 conveying the rotational mechanical energy to ring gear 114 and second electromagnetic device 50 (e.g., through input coupled clutch 140, etc.); and second electromagnetic device 50 transferring the rotational mechanical energy input to sun gear 122. With the rotation of ring gear 124 selectively fixed by output brake 170, the rotation of sun gear 122 rotates the plurality planetary gears 126 about central axes thereof, as well as about sun gear 122. The rotation of the plurality planetary gears 126 about the sun gear 122 drives carrier 128, and carrier 128 thereby drives carrier 118.

Referring still to FIG. 4, ring gear 114 is driven directly by connecting shaft 36. As shown in FIG. 4, carrier 118 is indirectly driven by connecting shaft 36 (e.g., by output planetary 120 when input coupled clutch 140 is engaged, etc.). The rotation of ring gear 114 and carrier 118 rotates the plurality of planetary gears 116 about central axes thereof such that sun gear 112 rotates. The rotation of sun gear 112 drives first electromagnetic device 40. In one embodiment, first electromagnetic device 40 thereby provides a startup power in response to a rotational input from engine 20. The rotation of sun gear 112 may facilitate first electromagnetic device 40 establishing a requisite operating condition (e.g., a requisite DC bus voltage, etc.) for controlling first electromagnetic device 40 and/or second electromagnetic device 50 in one or more desired states. In some embodiments, second electromagnetic device 50 is brought up to the threshold individually or jointly with first electromagnetic device 40 to establish the requisite DC bus voltage and control first electromagnetic device 40 and/or second electromagnetic device 50 in a desired state.

An alternative energy flow path in the active neutral startup mode in which drive system 100 includes: an energy storage device may include first electromagnetic device 40 providing a rotational mechanical energy input to sun gear 112 that is received by the plurality of planetary gears 116; the plurality of planetary gears 116 conveying the rotational mechanical energy to ring gear 114; and ring gear 114 transferring the rotational mechanical energy to connecting shaft 36 such that the rotational mechanical energy provided by first electromagnetic device 40 starts engine 20.

According to the exemplary embodiment shown in FIG. 4, engaging input coupled clutch 140 rotates second electromagnetic device 50 at the rotational speed of connecting shaft 36. Connecting shaft 36 may rotate at the same speed as engine 20 such that engine 20 and second electromagnetic device 50 operate at a 1:1 speed ratio. According to the exemplary embodiment shown in FIG. 4, engaging input coupled clutch 140 and output brake 170 rotates carrier 118 (e.g., through output planetary 120, etc.) while ring gear 114 rotates with connecting shaft 36. Engaging input coupled clutch 140 and output brake 170 may drive first electromagnetic device 40 at a rotational speed that is related to the rotational speed of carrier 118 and the rotational speed of ring gear 114. In one embodiment, the active neutral startup mode locks first electromagnetic device 40 and second electromagnetic device 50 in a fixed speed ratio with engine 20 (e.g., 1:1 between second electromagnetic device 50 and engine 20; 1.06:1 between first electromagnetic device 40 and engine 20, etc.).

Referring still to FIG. 4, transmission 30 isolates engine 20 from output shaft 32 during the active neutral startup mode (e.g., power split coupled clutch 130 and output coupled clutch 150 may be disengaged, etc.). Such isolation may reduce (e.g., substantially eliminate, etc.) a forward lurch potential traditionally associated with starting the vehicle (e.g., transmission 30 does not provide an output torque to tires 62 and/or tires 72 when in the active neutral startup mode, etc.).

In some embodiments, input coupled clutch 140 and output brake 170 remain engaged after first electromagnetic device 40 and/or second electromagnetic device 50 are activated into one or more desired operating states. With transmission 30 in the active neutral startup mode and first electromagnetic device 40 and/or second electromagnetic device 50 activated into one or more desired operating states, drive system 100 may generate electrical power. By way of example, rotation of connecting shaft 36 may rotate first electromagnetic device 40 and/or second electromagnetic device 50 to generate electrical power. In one embodiment, the electrical power is stored for future use. In another embodiment, the electrical power is used to actively power devices associated with the vehicle. In still another embodiment, the electrical power is used to power external devices (e.g., provide export power, etc.).

In other embodiments, at least one of input coupled clutch 140 and output brake 170 are disengaged in response to the generated startup power, the speed of first electromagnetic device 40 and/or second electromagnetic device 50, the generated voltage, and/or the generated voltage and generation time exceeding a threshold level. Such disengagement may prepare transmission 30 to be selectively reconfigured into a drive mode (e.g., low range, mid range, high range, etc.). By way of example, input coupled clutch 140 may be disengaged in response to first electromagnetic device 40 and second electromagnetic device 50 being activated and controlled (e.g., by controller 210, etc.). Only power split coupled clutch 130 may need to be engaged to selectively reconfigure transmission 30 into the mid range mode, thereby providing a simple and efficient process by which the vehicle may be shifted into a drive mode and driven. In one embodiment, activating one or more of the electromagnetic devices includes controlling second electromagnetic device 50 in a motoring mode where second electromagnetic device 50 provides an input torque to transmission 30 and is commanded to operate at a target speed. Such a speed may be based on the current vehicle speed (e.g., zero if the vehicle is not moving on flat ground, non-zero if the vehicle is rolling up or down a slope at startup, etc.). Commanding the operation of second electromagnetic device 50 may prepare transmission 30 for a shift from the active neutral startup mode of operation (i.e., a selective reconfiguration, etc.) to another driving mode of operation (e.g., a mid range mode of operation, etc.). Such preparation may decrease an inertial jerk on output shaft 32 during the shift.

Figure 5:
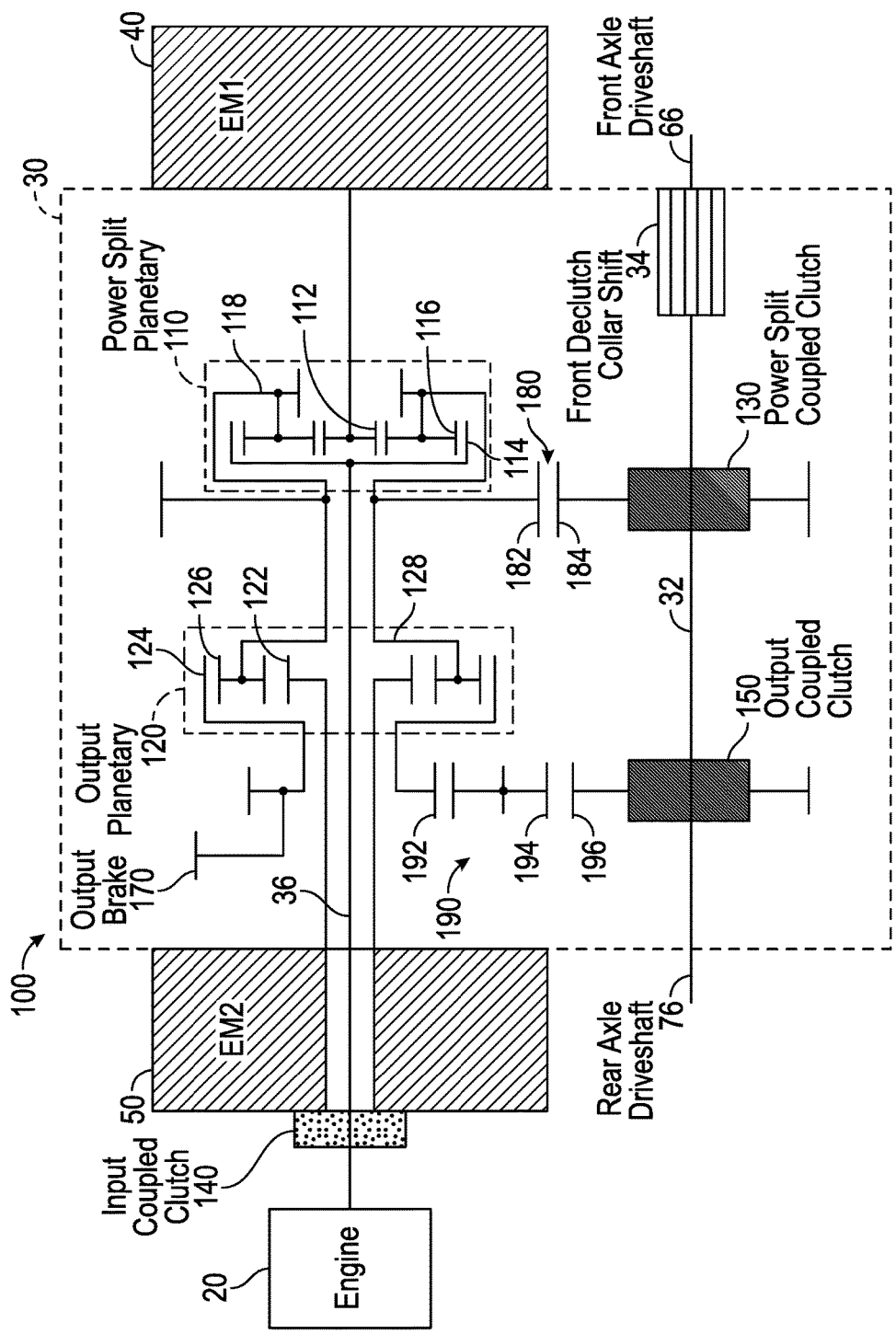
FIG. 5 is a detailed schematic view of a drive train configured in a low range mode of operation, according to an exemplary embodiment.

As shown in FIG. 5, transmission 30 is selectively reconfigured into a low range mode of operation such that transmission 30 allows for a low output speed operation with a high output torque. The low range mode increases a vehicle's gradability (e.g., facilitates the vehicle maintaining speed on a grade, etc.). In one embodiment, engine 20 provides a rotational mechanical energy input to transmission 30 such that first electromagnetic device 40 generates electrical power and second electromagnetic device 50 uses the generated electrical power to provide a rotational mechanical energy input to transmission 30. As such, engine 20 and second electromagnetic device 50 provide a rotational mechanical energy input to drive at least one of tires 62 and tires 72. In an alternative embodiment, first electromagnetic device 40 operates as a motor and second electromagnetic device 50 operates as a generator when transmission 30 is configured in the low range mode.

As shown in FIG. 5 and Table 1, power split coupled clutch 130 and output coupled clutch 150 are engaged when transmission 30 is configured in the low range mode. As shown in FIG. 5, power split coupled clutch 130 and output coupled clutch 150 couple gear set 180 and gear set 190 to output shaft 32, respectively. Accordingly, when engine 20 provides a rotational mechanical energy input to transmission 30, both power split planetary 110 and output planetary 120 drive output shaft 32 via gear set 180 and gear set 190, respectively. According to the exemplary embodiment shown in FIG. 5, an energy flow path for the low range includes: engine 20 providing a rotational mechanical energy input to connecting shaft 36; connecting shaft 36 conveying the rotational mechanical energy to ring gear 114; ring gear 114 causing the plurality of planetary gears 116 to rotate about central axes thereof, as well as about sun gear 112 such that both carrier 118 and sun gear 112 rotate; and the rotation of sun gear 112 driving first electromagnetic device 40 such that it operates as a generator (e.g., generates electrical energy, etc.).

Referring still to FIG. 5, the rotation of carrier 118 drives both carrier 128 and gear set 180. Carrier 128 drives the plurality of planetary gears 126 to rotate about sun gear 122 and about central axes thereof. In one embodiment, second electromagnetic device 50 receives electrical energy generated by first electromagnetic device 40. Accordingly, second electromagnetic device 50 operates as a motor, providing a rotational mechanical energy input to sun gear 122. The sun gear 122 conveys the rotational mechanical energy to the plurality of planetary gears 126 such that each further rotates about the central axis thereof. The plurality of planetary gears 126 drive ring gear 124, and the rotation of ring gear 124 drives gear set 190. According to the exemplary embodiment shown in FIG. 6, gear set 180 and gear set 190 transfer a torque to and from output shaft 32 with power split coupled clutch 130 and output coupled clutch 150 engaged. As such, engine 20 and second electromagnetic device 50 move a vehicle at a low speed with a high output torque.

Figure 6:
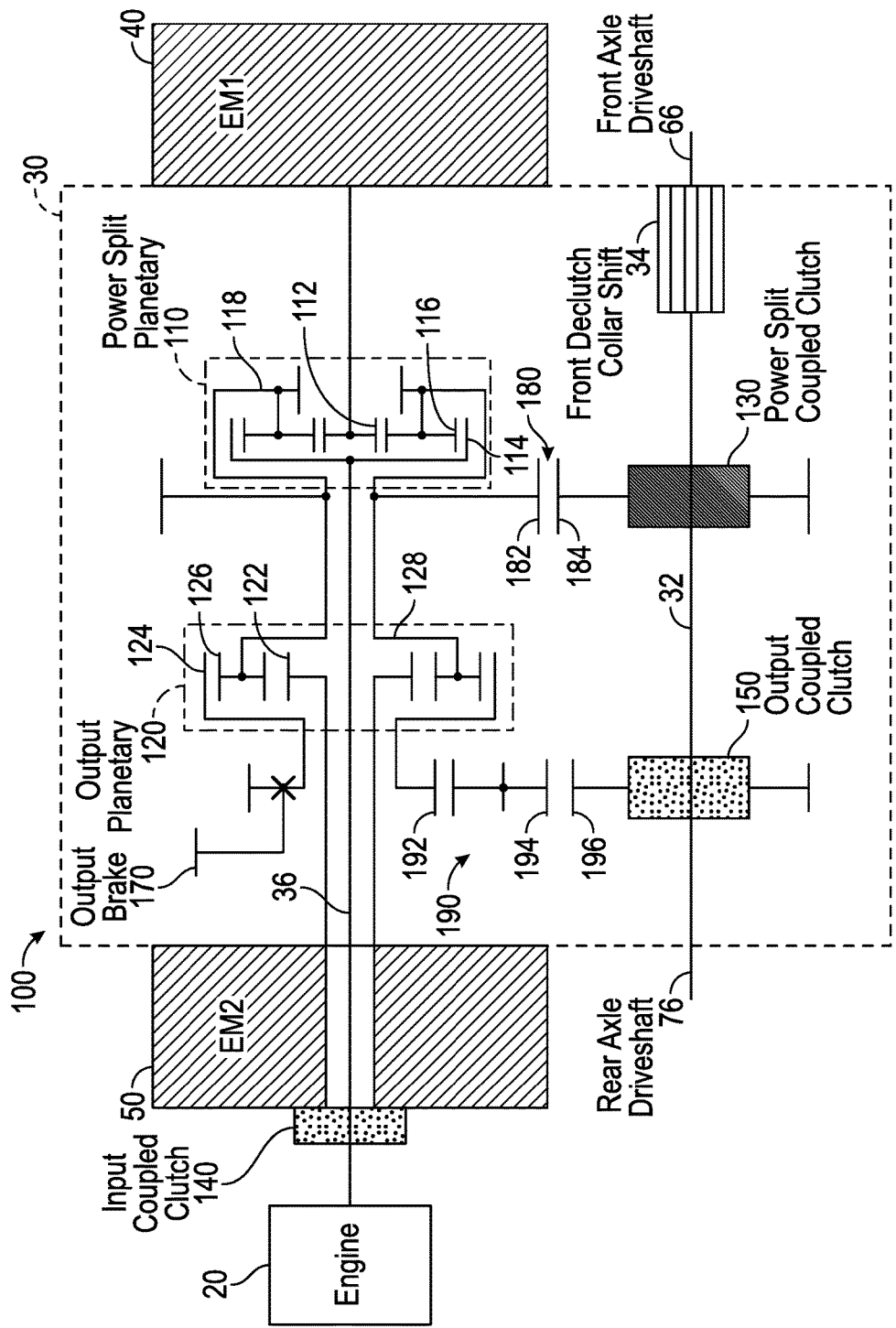
FIG. 6 is a detailed schematic view of a drive train configured in a mid range mode of operation, according to an exemplary embodiment.

As shown in FIG. 6, transmission 30 is selectively reconfigured into a mid range mode of operation such that transmission 30 allows for a mid range output speed operation. The mid range mode may improve low output speed torque and high output speed power. In one embodiment, engine 20 provides a rotational mechanical energy input such that first electromagnetic device 40 generates electrical power, and second electromagnetic device 50 uses the generated electrical power to provide a rotational mechanical energy input to transmission 30. Second electromagnetic device 50 thereby provides a rotational mechanical energy input to drive at least one of tires 62 and tires 72. In an alternative embodiment, second electromagnetic device 50 operates as a generator while first electromagnetic device 40 operates as a motor when transmission 30 is configured in the mid range mode. In still another alternative embodiment, both first electromagnetic device 40 and second electromagnetic device 50 operate as a generator in the mid range mode.

As shown in FIG. 6 and Table 1, power split coupled clutch 130 and output brake 170 are engaged when transmission 30 is configured in the mid range mode. As shown in FIG. 6, output brake 170 inhibits the rotation of gear set 190 (e.g., gear 192, gear 194, gear 196, etc.). Output brake 170 thereby rotationally fixes ring gear 124. In one embodiment, engaging output brake 170 substantially eliminates a power dip between output and input modes of transmission 30. According to the exemplary embodiment shown in FIG. 6, an energy flow path for the mid range mode includes: engine 20 providing a rotational mechanical energy input to connecting shaft 36 that is conveyed to ring gear 114; ring gear 114 driving the plurality of planetary gears 116 to rotate about central axes thereof, as well as about sun gear 112 such that both carrier 118 and sun gear 112 rotate; and the rotation of carrier 118 driving carrier 128, which rotates the plurality planetary gears 126 about central axes thereof, as well as about sun gear 122.

With ring gear 124 fixed by output brake 170, second electromagnetic device 50 may operate as a motor. In one embodiment, second electromagnetic device 50 receives electrical energy generated by first electromagnetic device 40. First electromagnetic device 40 operates as a generator, removing a rotational mechanical energy from sun gear 112. The sun gear 122 conveys the rotational mechanical torque to the plurality of planetary gears 126 such that each further rotates about sun gear 122 (e.g., at an increased rotational speed, etc.). The rotation of the plurality of planetary gears 126 (e.g., effected by sun gear 122, etc.) drives carrier 128 and thereby gear set 180. As shown in FIG. 6, power split coupled clutch 130 couples gear set 180 to output shaft 32 such that the rotational mechanical energy of gear set 180, received from second electromagnetic device 50, drives output shaft 32 at a mid range output speed and may thereby drive a vehicle at a mid range output speed.

Figure 7:
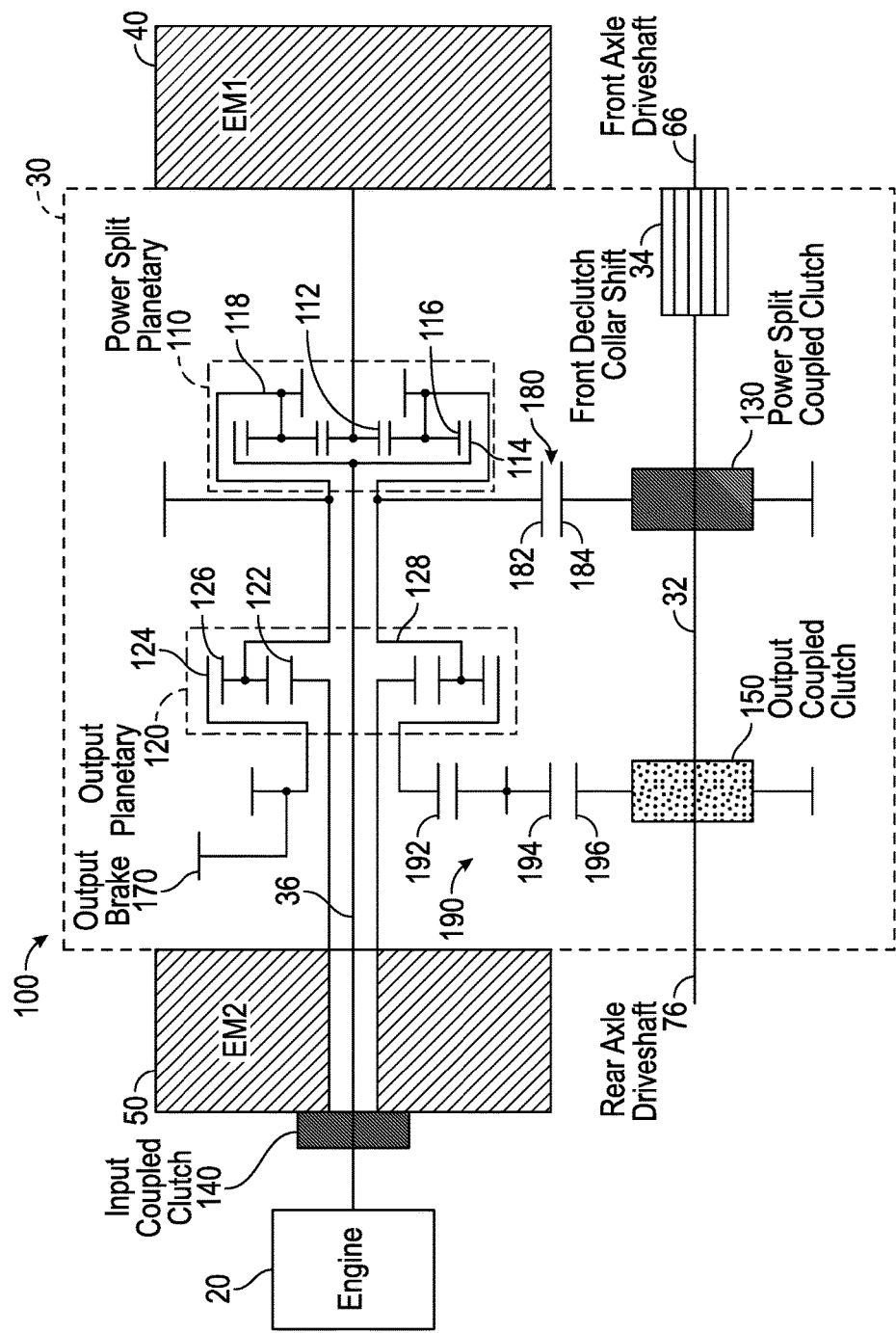
FIG. 7 is a detailed schematic view of a drive train configured in a high range mode of operation, according to an exemplary embodiment.

As shown in FIG. 7, transmission 30 is selectively reconfigured into a high range mode of operation such that transmission 30 allows for a high output speed operation. In one embodiment, engine 20 provides a rotational mechanical energy input such that second electromagnetic device 50 generates electrical power while first electromagnetic device 40 uses the generated electrical power to provide a rotational mechanical energy input to transmission 30. As such, engine 20 and first electromagnetic device 40 provide a rotational mechanical energy input to drive at least one of tires 62 and tires 72. In an alternative embodiment, first electromagnetic device 40 operates as a generator and second electromagnetic device 50 operates as a motor when transmission 30 is configured in the high range mode.

As shown in FIG. 7 and Table 1, power split coupled clutch 130 and input coupled clutch 140 are engaged when transmission 30 is configured in the high range mode. As shown in FIG. 7, the engagement of input coupled clutch 140 with connecting shaft 36 rotationally couples engine 20 and second electromagnetic device 50. By way of example, engine 20 may provide a rotational mechanical energy input to connecting shaft 36 such that second electromagnetic device 50 generates electrical energy. In one embodiment, first electromagnetic device 40 receives the electrical energy generated by second electromagnetic device 50. First electromagnetic device 40 operates as a motor, providing a rotational mechanical energy input to sun gear 112 that drives the plurality of planetary gears 116 and carrier 118.

Referring still to FIG. 7, power from engine 20 is transferred to ring gear 114 and the plurality of planetary gears 116. The plurality of planetary gears 116 are driven by both engine 20 (e.g., via ring gear 114, etc.) and first electromagnetic device 40 (e.g., via sun gear 112, etc.). Carrier 118 rotates, which drives gear set 180. As shown in FIG. 7, power split coupled clutch 130 couples gear set 180 to output shaft 32 such that the rotational mechanical energy provided by engine 20 and first electromagnetic device 40 drives a vehicle at a high range speed.

Figure 8:
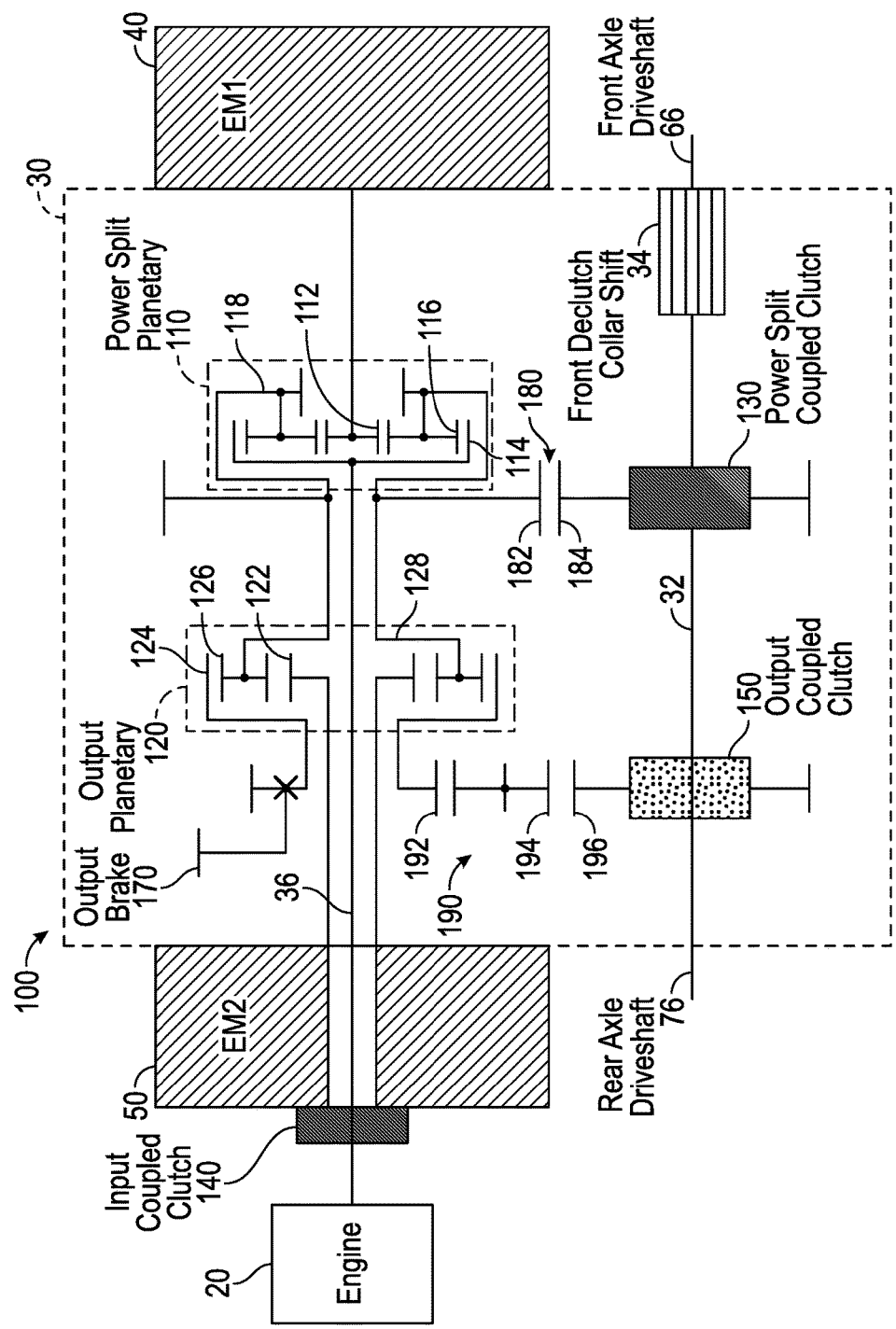
FIG. 8 is a detailed schematic view of a drive train configured in an intermediate shift mode of operation, according to an exemplary embodiment.

As shown in FIG. 8, transmission 30 is selectively reconfigured into an intermediate shift mode of operation that facilitates transitioning transmission 30 (i.e., shifting, changing modes, etc.) between the mid range mode of operation and the high range mode of operation. According to the embodiment shown in FIG. 8, input coupled clutch 140, power split coupled clutch 130, and output brake 170 are engaged when transmission 30 is selectively reconfigured into the intermediate shift mode of operation. According to an exemplary embodiment, the intermediate shift mode provides a smooth and robust shifting strategy that functions reliably even in a wide variety of operating conditions, when using various types of oil for the components of transmission 30, and when experiencing valve nonlinearities that may be present in one or more valves of transmission 30. The intermediate shift mode may provide a zero inertia shift through and across two or more overlapping ranges (e.g., the mid range and the high range, etc.). According to the exemplary embodiment shown in FIGS. 6-8, the intermediate shift mode eliminates the need to simultaneously disengage output brake 170 and engage input coupled clutch 140 to shift from the mid range mode to the high range mode, or vice versa. The intermediate shift mode reduces jerking sensations associated with simultaneously disengaging output brake 170 and engaging input coupled clutch 140 to shift from mid range to high range, providing a smoother ride.

During operation, the intermediate shift mode may be used to shift from mid range mode to high range mode or from high range mode to mid range mode. In one embodiment, transmission 30 is configured in the mid range mode of operation with power split coupled clutch 130 and output brake 170 engaged and configured in the high range mode of operation with power split coupled clutch 130 and input coupled clutch 140 engaged. Transmission 30 may be selectively reconfigured into the intermediate shift mode in response to the difference between a rotational speed of second electromagnetic device 50 and a rotational speed of connecting shaft 36 and/or engine 20 falling below or equaling a threshold level (e.g., approximately zero, five revolutions per minute, fifty revolutions per minute, etc.). Transmission 30 may enter the intermediate shift mode when the rotational speed of second electromagnetic device 50 substantially corresponds with (e.g., matches, is substantially equal to, etc.) the rotational speed of connecting shaft 36 and/or engine 20. In one embodiment, transmission 30 enters the intermediate shift mode when the rotational speeds of second electromagnetic device 50 and connecting shaft 36 and/or engine 20 are between 1,600 and 1,800 revolutions per minute (RPM). By way of example, transmission 30 may enter the intermediate shift mode when the rotational speeds of second electromagnetic device 50 and connecting shaft 36 and/or engine 20 are about 1,600 RPM. One or more sensors may be positioned to monitor the rotational speed of at least one of engine 20, connecting shaft 36, a portion of second electromagnetic device 50, or still another component. A controller (e.g., controller 210, etc.) may reconfigure transmission 30 into the intermediate shift mode in response to sensing signals provided by the one or more sensors.

Shifting into the intermediate shift mode occurs when there is limited (if any) relative movement between clutch disks of input coupled clutch 140. Transmission 30 may be reconfigured into the intermediate shift mode without compromising vehicle performance (e.g., since torque is not removed from output shaft 32, etc.). The intermediate shift mode reduces (e.g., minimizes, etc.) heat generation and clutch wear during shifts by limiting the relative movement between clutch disks of input coupled clutch 140 upon engagement. The intermediate shift mode may thereby increase clutch life.

In operation, the vehicle may be accelerating in the mid range mode. In one embodiment, second electromagnetic device 50 provides an output torque in the mid range mode of operation and its speed thereby increases with the speed of the vehicle. As the speed of second electromagnetic device 50 continues to increase with vehicle speed, second electromagnetic device 50 may begin to operate at a rotational speed similar to that of connecting shaft 36 and/or engine 20. Controller 210 may engage input coupled clutch 140 to selectively reconfigure transmission 30 into the intermediate shift mode from the mid range mode. The vehicle may alternatively be decelerating in the high range mode. In one embodiment, first electromagnetic device 40 operates as a motor in the high range mode of operation with its speed related to that of connecting shaft 36, engine 20, and/or the speed of the vehicle. The speed of the vehicle and/or the speed of first electromagnetic device 40 may decrease to a speed designated for mid range mode. Controller 210 may engage output brake 170 to selectively reconfigure transmission 30 into the intermediate shift mode from the high range mode.

As shown in FIGS. 6-8, power split coupled clutch 130 is engaged (i.e., is not disengaged, is not open, transfers torque, etc.) in each of the mid range mode, the intermediate shift mode, and the high mode. Transmission 30 having power split coupled clutch 130 engaged in each of these modes facilitates the continuous transfer of power from engine 20 to output shaft 32 during the shift from mid range mode to high range mode. According to an exemplary embodiment, engine 20 is also coupled to output shaft 32 via power split coupled clutch 130 at a fixed ratio during the intermediate shift mode. Maintaining a power path to output shaft 32 during the shift reduces (e.g., eliminates, etc.) jerking associated with shifting traditional transmission systems. In the intermediate shift mode, an acceleration of engine 20 causes an acceleration of the vehicle, and a deceleration of engine 20 causes a deceleration of the vehicle. Powering the vehicle with engine 20 during the shift event increases the overall efficiency of drive system 100 by reducing the electrical power path during the shift event.

Transmission 30 may be configured in the intermediate shift mode for an extended period of time and/or while the vehicle traverses an extended distance. Controller 210 may selectively reconfigure transmission 30 out of the intermediate shift mode (e.g., into the mid range mode of operation, into the high range mode of operation, etc.) automatically in response to at least one of an elapsed shift time (e.g., a time that has elapsed while in the intermediate shift mode, etc.), a traveled shift distance (e.g., a distance the vehicle has traveled while in the intermediate shift mode, etc.), a change in engine speed, and a request, among other conditions.

In one embodiment, controller 210 transitions transmission 30 out of the intermediate shift mode in response to an indication that the shift has satisfied at least one of a time-based and a distance-based condition. By way of one example, controller 210 may transition transmission 30 out of the intermediate shift mode in response to an indication that transmission 30 has been in the intermediate shift mode for longer than a predetermined period of time. By way of another example, controller 210 may transition transmission 30 out of the intermediate shift mode in response to an indication that the vehicle has traversed more than a threshold distance.

In another embodiment, controller 210 transitions transmission 30 out of the intermediate shift mode in response to a change in engine speed. Controller 210 may selectively reconfigure transmission 30 into the high range mode from the intermediate shift mode (e.g., by disengaging output brake 170, etc.) in response to an increase in engine speed (e.g., in response to the speed of engine 20 exceeding a threshold speed, etc.). By way of example, the vehicle may encounter a downhill slope, causing the engine speed to increase, and thereby prompting a shift into the high range mode of operation. By way of another example, the engine speed may increase based on a command (e.g., provided by an operator using an accelerator pedal or another input device, provided by a controller as part of an autonomous operation of the vehicle, etc.) that prompts the engine speed to increase.

Controller 210 may selectively reconfigure transmission 30 into the mid range mode from the intermediate shift mode (e.g., by disengaging input coupled clutch 140, etc.) in response to a decrease in engine speed (e.g., in response to the speed of engine 20 falling below a threshold speed, etc.). By way of example, the vehicle may encounter an uphill slope, causing the engine speed to decrease, and thereby prompting a shift into the mid range mode of operation. By way of another example, the engine speed may decrease based on a command (e.g., provided by an operator using a brake pedal or another input device, provided by an operator releasing an accelerator pedal or another input device, provided by a controller as part of an autonomous operation of the vehicle, etc.) that prompts the engine speed to decrease.

In still another embodiment, controller 210 transitions transmission 30 out of the intermediate shift mode in response to a request. By way of example, the request may come from an operator (e.g., provided by way of a user interface, etc.) and indicate the operator's command to enter either the mid range mode of operation or the high range mode of operation. The request may also be provided by a controller as part of an autonomous operation of the vehicle. Such requests may be provided in order to reenter a mode of operation whereby the vehicle operates more efficiently. Such requests may prompt transmission 30 to complete the shift from the mid range mode of operation to the high range mode of operation, complete the shift from the high range mode of operation to the mid range mode of operation, toggle back into the mid range mode of operation from the intermediate shift mode, and/or toggle back into the high range mode of operation from the intermediate shift mode.

In some embodiments, transmission 30 is selectively reconfigured into the intermediate shift mode from one of the mid range mode and the high range mode, and then is selectively reconfigured back into the previous mode (e.g., mid range mode to intermediate shift mode to mid range mode, etc.). By way of example, transmission 30 may be reconfigured into the intermediate shift mode from the mid range mode in response to second electromagnetic device 50 and engine 20 having a speed differential below a threshold level. An operator may keep engine 20 operating at substantially the same speed for a period of time, driving output shaft 32 with engine 20, and then release the accelerator pedal whereby transmission 30 may be returned to the mid range mode. In one embodiment, first electromagnetic device 40 generates electricity in the intermediate shift mode. Second electromagnetic device 50 may provide an output torque to output shaft 32 in the intermediate shift mode. In another embodiment, second electromagnetic device 50 generates electricity in the intermediate shift mode. First electromagnetic device 40 may provide an output torque to output shaft 32 in the intermediate shift mode. In still another embodiment, neither or both of first electromagnetic device 40 and second electromagnetic device 50 generate electrical power and/or provide output torque in the intermediate shift mode.

Figure 9:
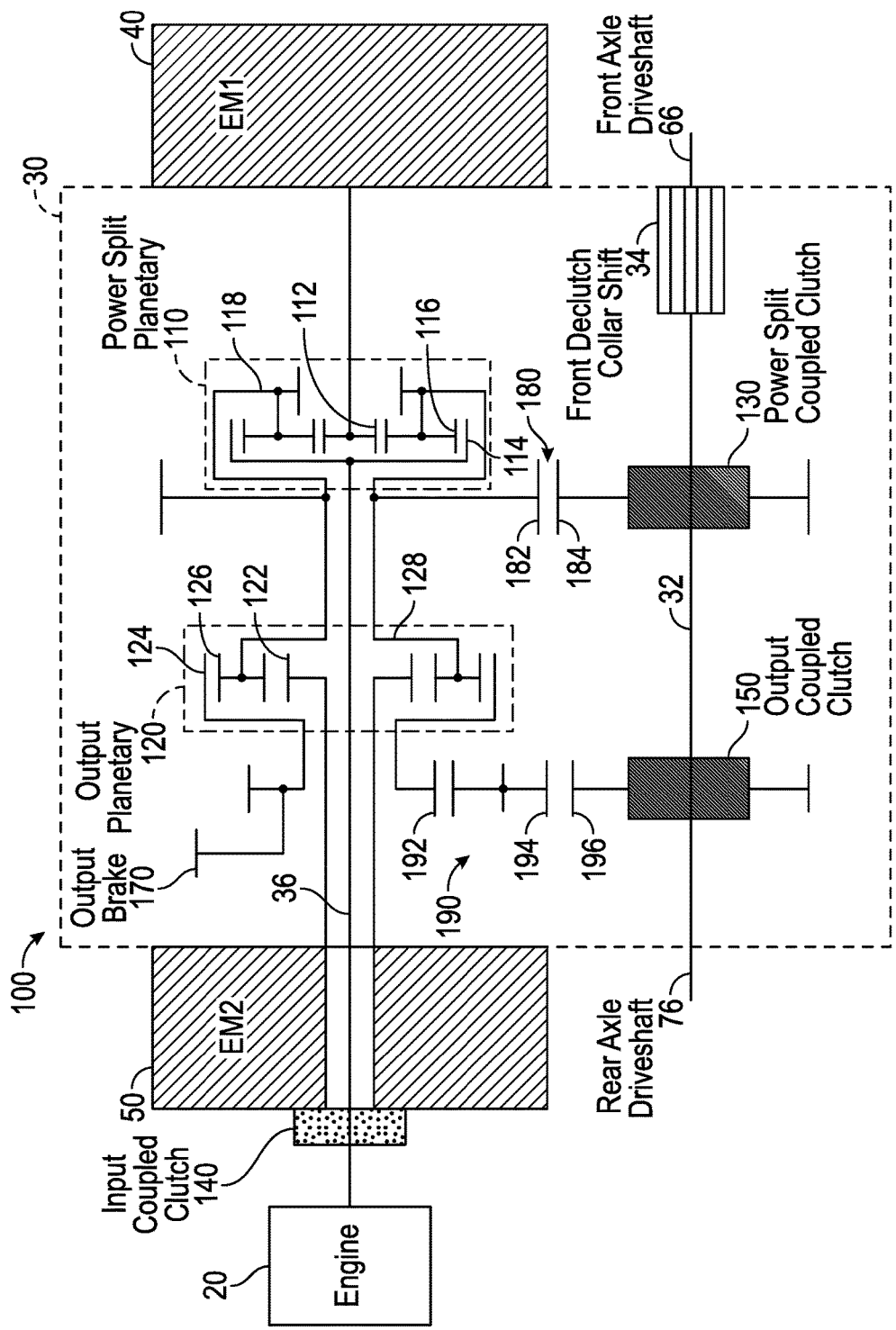
FIG. 9 is a detailed schematic view of a drive train configured in a low speed reverse mode of operation, according to an exemplary embodiment.

As shown in FIG. 9, transmission 30 is selectively reconfigured into a low speed reverse mode of operation. In one embodiment, engine 20 provides a rotational mechanical energy input to transmission 30 such that first electromagnetic device 40 generates electrical power and second electromagnetic device 50 uses the generated electrical power to provide a rotational mechanical energy input to transmission 30. As such, engine 20 and second electromagnetic device 50 provide a rotational mechanical energy input to drive at least one of tires 62 and tires 72 in a reverse direction (e.g., backwards, etc.). In an alternative embodiment, first electromagnetic device 40 operates as a motor and second electromagnetic device 50 operates as a generator when transmission 30 is configured in the low speed reverse mode.

As shown in FIG. 9 and Table 1, power split coupled clutch 130 and output coupled clutch 150 are engaged when transmission 30 is configured in the low speed reverse mode. As shown in FIG. 9, the low speed reverse mode is substantially similar to the low range mode of FIG. 5 in that power split coupled clutch 130 and output coupled clutch 150 couple both gear set 180 and gear set 190 to output shaft 32. In the low speed reverse mode, second electromagnetic device 50 may provide a rotational mechanical energy input to transmission 30 in an opposite direction as compared to the low range mode of FIG. 5.

Figure 10:
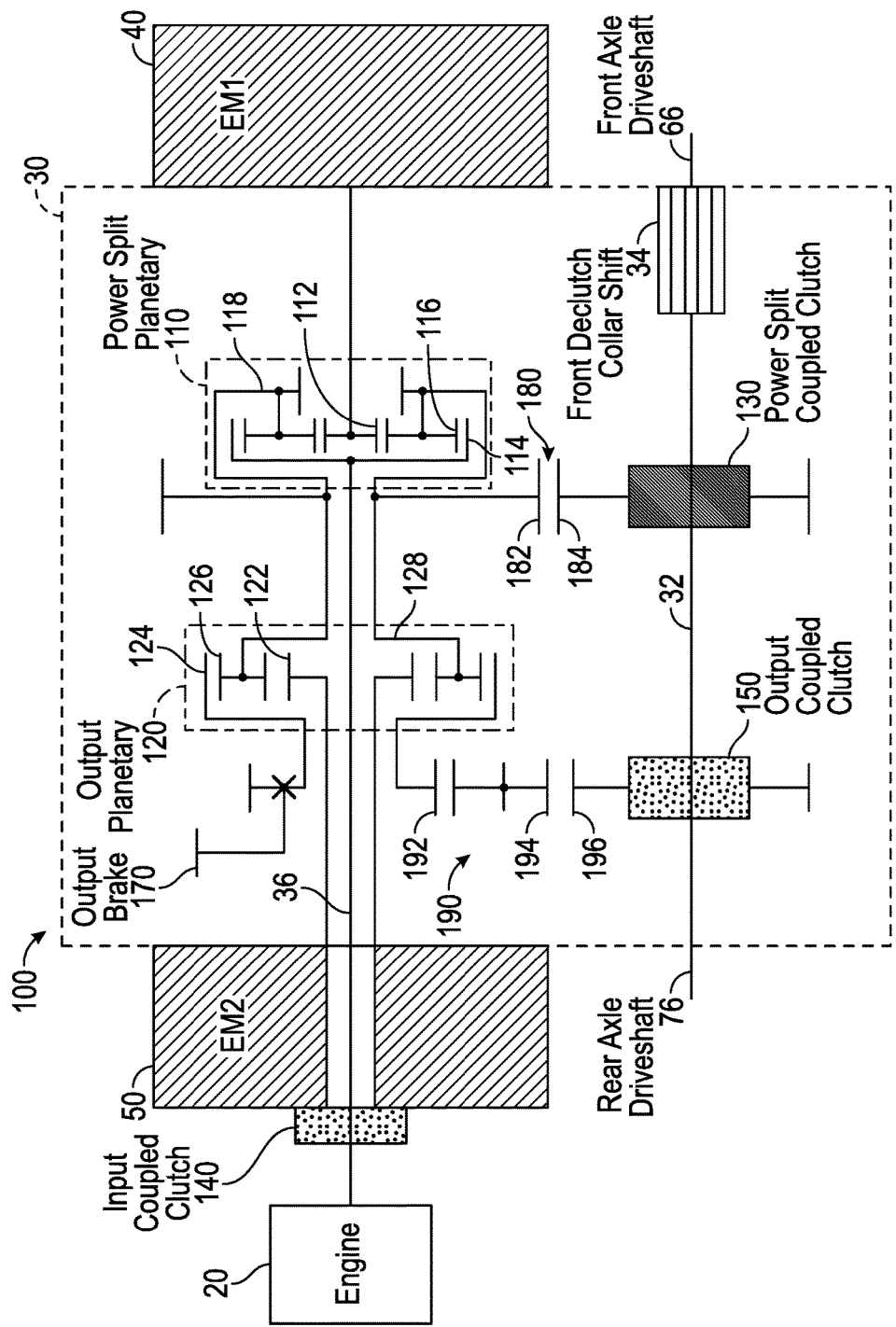
FIG. 10 is a detailed schematic view of a drive train configured in a high speed reverse mode of operation, according to an exemplary embodiment.

As shown in FIG. 10, transmission 30 is selectively reconfigured into a high speed reverse mode of operation such that transmission 30 allows for a high reverse output speed operation. In one embodiment, engine 20 provides a rotational mechanical energy input such that first electromagnetic device 40 generates electrical power, and second electromagnetic device 50 uses the generated electrical power to provide a rotational mechanical energy input to transmission 30. As such, second electromagnetic device 50 provides a rotational mechanical energy input to drive at least one of tires 62 and tires 72. In an alternative embodiment, second electromagnetic device 50 operates as a generator and first electromagnetic device 40 operates as a motor when transmission 30 is configured in the high speed reverse mode. In still another alternative embodiment, both first electromagnetic device 40 and second electromagnetic device 50 operate as a generator in the high speed reverse mode.

As shown in FIG. 10 and Table 1, power split coupled clutch 130 and output brake 170 are engaged when transmission 30 is configured in the high speed reverse mode. As shown in FIG. 10, output brake 170 inhibits the rotation of gear set 190 (e.g., gear 192, gear 194, gear 196, etc.). Output brake 170 thereby rotationally fixes ring gear 124. According to the exemplary embodiment shown in FIG. 10, an energy flow path for the high speed reverse mode includes: engine 20 providing a rotational mechanical energy input to connecting shaft 36 that is conveyed to ring gear 114; and ring gear 114 driving the plurality of planetary gears 116 to rotate about central axes thereof, as well as about sun gear 112 such that both carrier 118 and sun gear 112 rotate.

Referring still to FIG. 10, the rotation of carrier 118 drives carrier 128, which rotates the plurality planetary gears 126 about central axes thereof, as well as about sun gear 122. With ring gear 124 fixed by output brake 170, second electromagnetic device 50 may operate as a motor. In one embodiment, second electromagnetic device 50 receives electrical energy generated by first electromagnetic device 40. Accordingly, first electromagnetic device 40 operates as a generator, removing a rotational mechanical energy from sun gear 112. The sun gear 122 conveys the rotational mechanical torque to the plurality of planetary gears 126 such that each further rotates about sun gear 122 (e.g., at an increased rotational speed, etc.). The rotation of the plurality of planetary gears 126 (e.g., effected by sun gear 122, etc.) drives carrier 128 and thereby gear set 180. As shown in FIG. 10, power split coupled clutch 130 couples gear set 180 to output shaft 32 such that the rotational mechanical energy of gear set 180, received from second electromagnetic device 50, drives output shaft 32 at a high reverse output speed and may thereby drive a vehicle at a high reverse output speed.

According to an alternative embodiment, engine 20 does not provide a rotational mechanical energy input to drive a vehicle. By way of example, first electromagnetic device 40, second electromagnetic device 50, and/or another device may store energy during the above mentioned modes of operation. When sufficient energy is stored (e.g., above a threshold level, etc.), at least one of first electromagnetic device 40 and second electromagnetic device 50 may provide a rotational mechanical energy input to transmission 30 such that the vehicle is driven without an input from engine 20 (e.g., an electric mode, etc.).

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps. contrariwise As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the electromechanical variable transmission as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A vehicle, comprising:
   a drive axle;
   a multi-mode transmission including:
      a first gear set having a first planetary gear carrier and a second gear set having a second planetary gear carrier;
      a first motor/generator coupled to the first gear set;
      a second motor/generator coupled to the second gear set and selectively coupled to a connecting shaft;
      a brake positioned to selectively limit a rotational movement of a ring gear of the second gear set when engaged;
      a first clutch selectively rotationally coupling the first gear set and the second gear set to the drive axle when engaged; and
      a second clutch selectively rotationally coupling the second motor/generator to the connecting shaft when engaged; and
   a controller coupled to the multi-mode transmission and configured to engage the second clutch, the brake, and the first clutch to selectively reconfigure the multi-mode transmission to an intermediate shift mode of operation.

2. The vehicle of claim 1, wherein the controller is configured to selectively transition the multi-mode transmission into the intermediate shift mode of operation in response to the second motor/generator having a rotational speed that is substantially equal to a rotational speed of the connecting shaft.

3. The vehicle of claim 1, wherein the controller is configured to selectively transition the multi-mode transmission into the intermediate shift mode of operation in response to the difference between a rotational speed of the second motor/generator and a rotational speed of the connecting shaft falling below a threshold level.

4. The vehicle of claim 1, wherein the connecting shaft is coupled to the drive axle through a fixed ratio when the multi-mode transmission is selectively reconfigured into the intermediate shift mode of operation.

5. The vehicle of claim 1, wherein the controller is configured to:
   engage the brake and the first clutch to selectively reconfigure the multi-mode transmission into a mid range mode of operation.

6. The vehicle of claim 5, wherein the controller is configured to:
   disengage the brake to selectively reconfigure the multi-mode transmission into a high range mode of operation from the intermediate shift mode of operation and thereby complete a transition between the mid range mode of operation and the high range mode of operation.

7. The vehicle of claim 1, further comprising an engine coupled to the connecting shaft and configured to provide a rotational input to the multi-mode transmission.

8. The vehicle of claim 1, wherein the first motor/generator and the second motor/generator are each configured to receive stored energy from an energy storage device and provide a mechanical energy output such that the multi-mode transmission is configured to drive the drive axle without receiving a mechanical energy input from an engine.

9. The vehicle of claim 1, wherein the controller is configured to automatically transition the multi-mode transmission out of the intermediate shift mode of operation in response to at least one of an elapsed shift time, a traveled shift distance, a change in a speed of the connecting shaft, and a request.

10. The vehicle of claim 1, wherein the first planetary gear carrier and the second planetary gear carrier are rotatably coupled, and wherein the first clutch is configured to selectively rotationally couple the first planetary gear carrier and the second planetary gear carrier to the drive axle when engaged.

11. A drive system for a vehicle, comprising:
- a first gear set including a first sun gear, a first ring gear, a first plurality of planetary gears coupling the first sun gear to the first ring gear, and a first carrier rotationally supporting the first plurality of planetary gears;
- a second gear set including a second sun gear, a second ring gear, a second plurality of planetary gears coupling the second sun gear to the second ring gear, and a second carrier rotationally supporting the second plurality of planetary gears;
- a first electrical machine coupled to the first gear set;
- a second electrical machine coupled to the second gear set;
- a connecting shaft coupled to the first gear set;
- a brake positioned to selectively limit a rotational movement of the second gear set when engaged;
- a first clutch selectively rotationally coupling the first carrier and the second carrier to a driveshaft output of the vehicle when engaged; and
- a second clutch selectively rotationally coupling the second electrical machine to the connecting shaft when engaged,
- wherein the drive system is selectively reconfigurable into an intermediate shift mode of operation, in which the brake, the first clutch, and the second clutch are engaged.

12. The drive system of claim 11, wherein the drive system is transitioned from the intermediate shift mode of operation in response to at least one of an elapsed shift time, a traveled shift distance, a change in a speed of the connecting shaft, and a request.

13. The drive system of claim 12, wherein the connecting shaft is coupled to an engine, wherein the drive system is transitioned from the intermediate shift mode of operation and into a first mode of operation by disengaging the second clutch in response to the engine falling below a first threshold speed, and wherein the drive system is transitioned from the intermediate shift mode of operation and into a second mode of operation by disengaging the brake in response to the engine exceeding a second threshold speed.

14. The drive system of claim 11, wherein the second clutch is disengaged to transition from the intermediate shift mode of operation to a first mode of operation, and wherein the brake is disengaged to transition from the intermediate shift mode of operation to a second mode of operation.

15. The drive system of claim 11, wherein the connecting shaft is coupled to an engine and configured to receive a rotational input from the engine.

16. The drive system of claim 11, wherein the first electrical machine and the second electrical machine are each configured to receive stored energy from an energy storage device and provide a mechanical energy output such that the drive system is configured to drive the driveshaft output without receiving a mechanical energy input from an engine.

17. The drive system of claim 11, wherein the drive system is transitioned into the intermediate shift mode of operation in response to the second electrical machine having a rotational speed that is substantially equal to a rotational speed of the connecting shaft.

18. The drive system of claim 11, wherein the drive system is transitioned into the intermediate shift mode of operation in response to the difference between a rotational speed of the second electrical machine and a rotational speed of the connecting shaft falling below a threshold level.

19. The drive system of claim 11, wherein the connecting shaft is coupled to the driveshaft output of the vehicle through a fixed ratio when the drive system is selectively reconfigured into the intermediate shift mode of operation.

20. A method of operating a multi-mode transmission of a vehicle, the method comprising:
- engaging a brake and first clutch of the multi-mode transmission to configure the multi-mode transmission into a first mode of operation whereby a first electromagnetic device is coupled to a connecting shaft, the first clutch coupling a first planetary gear set and a second planetary gear set to a driveshaft output of the vehicle when engaged;
- engaging a second clutch of the multi-mode transmission to couple the connecting shaft and a second electromagnetic device, thereby configuring the multi-mode transmission into an intermediate shift mode; and
- at least one of (i) disengaging the brake to complete a reconfiguration of the multi-mode transmission into a second mode of operation and (ii) disengaging the second clutch to revert the multi-mode transmission into the first mode of operation from the intermediate shift mode.

* * * * *